United States Patent
Hernández-Pajares et al.

(10) Patent No.: US 9,494,693 B2
(45) Date of Patent: Nov. 15, 2016

(54) METHOD, APPARATUS, AND SYSTEM FOR DETERMINING A POSITION OF AN OBJECT HAVING A GLOBAL NAVIGATION SATELLITE SYSTEM RECEIVER BY PROCESSING UNDIFFERENCED DATA LIKE CARRIER-PHASE MEASUREMENTS AND EXTERNAL PRODUCTS LIKE IONOSPHERE DATA

(75) Inventors: Manuel Hernández-Pajares, Barcelona (ES); José Miguel Juan Zornoza, Barcelona (ES); Jaume Sanz Subirana, Barcelona (ES); Jaron Samson, Amsterdam (NL); Michel Mathias Maria Tossaint, Amsterdam (NL)

(73) Assignee: European Space Agency, Paris (FR)

( * ) Notice: Subject to any disclaimer, the term of this patent is extended or adjusted under 35 U.S.C. 154(b) by 457 days.

(21) Appl. No.: 14/007,647

(22) PCT Filed: Mar. 25, 2011

(86) PCT No.: PCT/EP2011/001512
§ 371 (c)(1),
(2), (4) Date: Nov. 21, 2013

(87) PCT Pub. No.: WO2012/130252
PCT Pub. Date: Oct. 4, 2012

(65) Prior Publication Data
US 2014/0070992 A1    Mar. 13, 2014

(51) Int. Cl.
*G01S 19/01* (2010.01)
*G01S 19/29* (2010.01)
(Continued)

(52) U.S. Cl.
CPC ............. *G01S 19/29* (2013.01); *G01S 19/02* (2013.01); *G01S 19/44* (2013.01)

(58) Field of Classification Search
CPC ........ G01S 19/01; G01S 19/02; G01S 19/04; G01S 19/29; G01S 19/44; G01S 19/54
USPC .................. 342/357.39, 357.37, 357.41
See application file for complete search history.

(56) References Cited

U.S. PATENT DOCUMENTS

| 2006/0164297 A1 | 7/2006 | Hernandez-Pajares |
| 2009/0027264 A1* | 1/2009 | Chen ............ G01S 19/04 342/357.27 |

(Continued)

FOREIGN PATENT DOCUMENTS

| AU | 199668100 B2 | 5/1997 |
| RU | 2 181 490 C2 | 1/1999 |

(Continued)

OTHER PUBLICATIONS

Andrei, C.-O., et al., "Ionosphere Effect Mitigation for Single-Frequency Precise Point Positioning," Proceedings of the 22nd International Technical Meeting of the Satellite Division of the Institute of Navigation, Savannah, Ga., Sep. 22-25, 2009, pp. 2508-2517.

(Continued)

*Primary Examiner* — Harry Liu
(74) *Attorney, Agent, or Firm* — Christensen O'Connor Johnson Kindness PLLC

(57) ABSTRACT

A method for determining a position of an object having a Global Navigation Satellite System (GNSS) receiver comprises receiving signals that are transmitted by GNSS transmitters positioned on board satellites positioned in view of the object; updating service data in the object, the service data including satellite clock data, satellite orbit data, satellite delay code bias data relating to delay code biases of the GNSS transmitters, and ionospheric model data indicating a state of an ionosphere; determining, based on the ionospheric model data, ionospheric delay data indicating corrections relating to delays of the signals, the delays of the signals resulting from passage of the signals through the ionosphere, and reception of the signals by the GNSS receiver; and determining a position of the object based on the signals, the satellite clock data, the satellite orbit data, the satellite delay code bias data, and the determined ionospheric delay data.

12 Claims, 10 Drawing Sheets

(51) Int. Cl.
*G01S 19/44* (2010.01)
*G01S 19/02* (2010.01)

(56) References Cited

U.S. PATENT DOCUMENTS

2010/0085253 A1* 4/2010 Ferguson ............... G01S 19/04
342/357.41
2012/0286991 A1* 11/2012 Chen ..................... G01S 19/04
342/357.23

FOREIGN PATENT DOCUMENTS

| RU | 2 256 935 C2 | 7/2005 |
| WO | 98/14797 A1 | 4/1998 |
| WO | 2008105778 A2 | 9/2008 |

OTHER PUBLICATIONS

Chen, K., and Y. Gao, "Real-Time Precise Point Positioning Using Single Frequency Data," Proceedings of the 18th International Technical Meeting of the Satellite Division of the Institute of Navigation, Long Beach, Calif., Sep. 13-16, 2005, pp. 1514-1523.

Geng, J., et al., "Rapid Re-Convergences to Ambiguity-Fixed Solutions in Precise Point Positioning," Journal of Geodesy 84(12):705-714, Dec. 2010.

International Search Report dated Aug. 16, 2011, in International Application No. PCT/EP2011/001512, filed Mar. 25, 2011, 2 pages.

Li, X., et al., "Regional Reference Network Augmented Precise Point Positioning for Instantaneous Ambiguity Resolution," Journal of Geodesy 85(3):151-158, Mar. 2011.

Melbourne, W. G., "The Case for Ranging in GPS-Based Geodetic Systems," Proceedings of First International Symposium on Precise Positioning with the Global Positioning System, Rockville, Md., Apr. 15-19, 1985, vol. 1, pp. 373-386.

Vollath, U., et al., "Analysis of Three-Carrier Ambiguity Resolution (TCAR) Technique for Precise Relative Positioning in GNSS-2," Proceedings of the 11th International Technical Meeting of the Satellite Division of the Institute of Navigation, Nashville, Tenn., Sep. 15-18, 1998, pp. 417-426.

Wübbena, G., "Software Developments for Geodetic Positioning With GPS Using TI-4100 Code and Carrier Measurements," Proceedings of First International Symposium on Precise Positioning With the Global Positioning System, Rockville, Md., Apr. 15-19, 1985, pp. 403-412.

Zumberge, J. F., et al., "Precise Point Positioning for the Efficient and Robust Analysis of GPS Data From Large Networks," Journal of Geophysical Research: Solid Earth, 102(B3):5005-5017, Mar. 1997.

Official Action mailed Jan. 21, 2015, issued in corresponding Russian Application No. 2013147401/07(073683), filed Mar. 25, 2011, 9 pages.

Russian Decision on Grant mailed Apr. 22, 2015, issued in corresponding Russian Application No. RU 2013147401/07(073683), filed Mar. 25, 2011, 19 pages

* cited by examiner

METHOD, APPARATUS, AND SYSTEM FOR DETERMINING A POSITION OF AN OBJECT HAVING A GLOBAL NAVIGATION SATELLITE SYSTEM RECEIVER BY PROCESSING UNDIFFERENCED DATA LIKE CARRIER-PHASE MEASUREMENTS AND EXTERNAL PRODUCTS LIKE IONOSPHERE DATA

TECHNICAL FIELD

The present disclosure relates to a method and an apparatus for navigation using satellite-transmitted radio signals and service data provided by a service provider.

The present disclosure is, though not exclusively, applicable to the field of world-wide, position-independent navigation, preferably based on carrier-phase measurements.

BACKGROUND

In the field of satellite navigation, a position of an object, which can be a stationary object or a moving object, is determined using radio signals transmitted by satellites orbiting earth. In the case of a moving object, information relating to the movement of the object, for instance, its direction and speed, can be obtained in this manner. Commonly, in the field of satellite navigation, the object is referred to as a "rover," or also as a "user." Without intended limitation, in the following, it will be referred to a "rover" or a "user" when describing the present disclosure.

There are various techniques known in the art for determining the position of a rover using satellite-transmitted radio signals. All of these techniques require the knowledge of the instantaneous position of a number of satellites orbiting earth (wherein the satellites may also be geostationary satellites) and the knowledge of high-precision clocks installed aboard these satellites. The satellite-transmitted radio signals comprise time-stamped information that is transmitted by superimposing a pseudo-random signal on the carrier frequencies of the signals. Upon reception, so-called code observables or pseudorange observables are determined from the time-stamped information. Having knowledge of the position of the satellites, the time of transmission of the signals, and the time of reception of the signals at the rover, the coordinates of the rover with respect to the satellites may be determined by triangulation.

Apart from the above-described time-stamped information that is superimposed on the carrier frequency, the carrier phase can be used to determine the position of a rover. Based on the phases of the carrier signals, so-called phase observables can be obtained and used in determining the position of the rover, as will be described below.

A widely employed satellite navigation system is the "Global Positioning System," or "GPS." GPS satellites transmit signals into two frequency bands, generally referred to as $L_1$ with a carrier frequency of 1.575 GHz and $L_2$ with a carrier frequency of 1.227 GHz. Thus, the GPS is referred to as a "dual frequency" system. Future satellite navigation systems are the "Galileo" system and the "modernized GPS" system, which will provide satellites transmitting in three frequency bands. In the following, these (and comparable) systems will be summarizingly referred to as "Global Navigation Satellite Systems," or "GNSS."

A known technique for determining the position of a rover using signals of three different carrier frequencies is the "Wide Area Real Time Kinematic," or "WARTK" technique, as described in U.S. Pre-Grant Publication No. 2006/0164297. According to the WARTK technique, the rover needs to be in contact with a network of fixed reference stations also receiving the satellite-transmitted signals. Herein, being in contact with the network of reference stations is meant such that the rover receives data relating to radio signals received at one or more of the reference stations of the network from the network via a ground-based or space-based means of communication. Both the rover and the reference stations obtain pseudorange observables and carrier-phase observables from the satellite-transmitted signals, and the network provides, via a ground-based or space-based means of communication, the pseudorange observables and carrier-phase observables obtained at the one or more reference stations to the rover. In the rover, double differences between satellite-receiver pairs of the observables are taken. If, for instance, $O_1^1$ is an observable relating to a signal of a first satellite obtained at the rover, $O_1^2$ is an observable relating to a signal from a second satellite received at the rover, $O_2^1$ is an observable relating to a signal from the first satellite obtained at the reference station and $O_2^2$ is an observable relating to a signal from the second satellite obtained at the reference station, such a double difference would be given by $(O_1^1-O_1^2)-(O_2^1-O_2^2)$. A more detailed description of double-differences is given in the article "*Analysis of Three Carrier Ambiguity Resolution (TCAR) Technique for Precise Relative Positioning in GNSS-2*," by U. Vollath et al., published in "Proceedings of the ION GPS," 1988, ix-o-13, pages 1-6.

By taking these double differences, a number of observation errors and instrumental errors are canceled. However, the maximal distance between the rover and the reference stations is limited, because the signals received by the rover and the signals received by the reference stations are affected differently by delays occurring due to the passage of these signals through the ionosphere. Therefore, with increasing distance between the rover and the reference stations, the observables obtained at the rover and at the reference stations are de-correlated by the ionospheric delays. This problem is addressed by a real-time ionospheric model which is computed from the network of reference stations and provided to the rover via a ground-based or space-based means of communication. This model is determined from an analysis of dual-frequency carrier-phase and code observables obtained at the reference stations of the network. By way of this ionospheric model, the effect of the de-correlation of observables obtained at the rover and at the reference stations may be determined and taken into account in determining the rover position. Thereby, the impact of the above-described de-correlation may be mitigated.

While with this approach, possible separations between the rover and the reference stations of several hundred kilometers can be obtained, the network of reference stations required for performing the WARTK technique still needs to be relatively dense. On the other hand, the transmission of the observables from the reference receivers to the rover receiver requires a high bandwidth of the transmission channel, and this requirement limits considerably the number of possible reference receivers. Therefore, coverage for a navigation service employing the WARTK technique is feasible at most on a continental scale, but providing a world-wide navigation service based on the WARTK technique in view of this limitation is not possible.

In view of the above explanations, it also becomes evident that the WARTK technique is only applicable in regions in which reference stations are provided. In a region without reference stations, or at a position remote from reference stations, the determination of the rover position is considerably impeded, if not made impossible. Therefore, the WARTK technique is typically not deployable for navigation in large areas of wilderness, in mountain ranges, or generally in impassable areas, or for navigation on large bodies of water or deserts. Accordingly, an application of the WARTK technique is only of very limited use for aviation, seafaring, or exploration. Furthermore, breakdown of individual reference stations, as might occur due to local events such as severe weather conditions or electrical power outage, considerably impede navigation of rovers in an area in which a broken-down reference station is the nearest reference station.

An alternative technique for determining the position of a rover is the "Precise Point Positioning," or "PPP" technique, as discussed for instance in J. F. Zumberge et al., *"Precise point positioning for the efficient and robust analysis of GPS data from large networks,"* Journal of Geophysical Research, Vol. 102, No. B3, pp. 5005-5017, 1997 doi: 10.1029/96JB03860. PPP is considered as a technique that allows a multiple-frequency GNSS user to determine his position at the decimeter error level in a kinematic mode and at the centimeter level in a static mode with a single receiver. This is based on the availability of satellite products or service data, such as data relating to the orbits of the GNSS satellites and data relating to the internal clocks of the GNSS satellites (i.e., the difference between the satellite clocks with respect to the GNSS time scale, hereinafter referred to as satellite clocks). For the purposes of the PPP technique, these satellite products need to be significantly more precise than those computed, e.g., by the GPS control segment. Therefore in the context of the PPP technique, the data relating to the orbits of the GNSS satellites is commonly referred to as "precise orbits," and the data relating to the internal clocks of the GNSS satellites is commonly referred to as "precise clocks."

The basic features of the PPP technique will be described in the following with reference to FIG. 10.

In step S1201, precise clocks and precise orbits of the GNSS satellites are received by the user. These precise clocks and precise orbits are provided by a GNSS service provider. Assuming that at a given timing a number n of GNSS satellites are in view of the user, the positions of these satellites predicted from the precise orbits are denoted $\vec{r}^i$ and the internal clocks of these GNSS satellites are denoted $dt^i$ for i=1, . . . , n denoting a particular GNSS satellite. Here and in the following, "in view of the user" is meant to be understood in a sense that a signal transmitted by a GNSS transmitter in view of the user can travel to a GNSS receiver associated to the user substantially on a straight line (line of sight between the GNSS transmitter and the GNSS receiver) without being obstructed by solid objects such as, for example, buildings, mountains, or the earth itself. In the following, data provided by such a service provider, comprising, but not being limited to, precise clocks and precise orbits, will be referred to as "service data" 1206.

In step S1202, signals 1207 of two different carrier frequencies transmitted by GNSS transmitters aboard the satellites in view of the user are received by a GNSS receiver associated to the user. If the two different carrier frequencies are denoted by $f_1$ and $f_2$, n signals of carrier frequency $f_1$ and n signals of carrier frequency $f_2$ are received by the user (by the GNSS receiver associated to the user).

At step S1203, n carrier-phase observables $L_1^i$ relating to the carrier phases of the signals of carrier frequency $f_1$; n carrier-phase observables $L_2^i$ relating to the carrier phases of the signals of carrier frequency $f_2$; n code observables $P_1^i$ relating to the time-stamped information transmitted with the signals of carrier frequency $f_1$; and n code observables $P_2^i$ relating to the time-stamped information transmitted with the signals of carrier frequency $f_2$ are obtained from these signals.

A code observable $P_j^i$ relating to a signal of carrier frequency $f_j$ is derived from a time difference between signal reception at the GNSS receiver and a time of signal transmission at the corresponding GNSS transmitter via $P_j^i = c(t_k - t^i)$, where $t_k$ is the reception time, measured by the receiver clock, $t^i$ is the transmission time, measured by the GNSS transmitter clock, and c is the vacuum speed of light. Said time difference can be obtained from time-stamped information constituted by a pseudo-random code that is superimposed on the carrier wave of the signal. A carrier-phase observable $L_j^i$ relating to a signal of carrier frequency $f_j$ is derived from a difference between a phase of the carrier wave of the signal at reception time and a phase of the carrier signal at transmission time via $L_j^i = \lambda_j(\phi_k - \phi^i) + \lambda_j N_j^i$, where $\phi_k$ is the phase of the carrier signal at reception time, including any receiver carrier-phase bias, $\phi^i$ is the phase of the carrier phase at transmission time, including any transmitter carrier-phase bias, $\lambda_j$ is the wavelength of the carrier signal, and $N_j^i$ is an integer number of full cycles. The integer number of full cycles $N_j^i$ unknown since only a fractional phase is measured. All observables are affected by a number of instrumental and/or observational errors discussed below.

In step S1204, so-called ionospheric-free carrier-phase observables $L_c^i$ and ionospheric-free code observables $P_c^i$ are determined from the carrier-phase observables $L_1^i$, $L_2^i$ and the code observables $P_1^i$, $P_2^i$ by forming linear combinations of these observables. Specifically, the ionospheric-free combinations $L_c^i$ and $P_c^i$ are given by:

$$L_c^i = \frac{(f_1)^2 L_1^i - (f_2)^2 L_2^i}{(f_1)^2 - (f_2)^2} \tag{Eq. 1}$$

$$P_c^i = \frac{(f_1)^2 P_1^i - (f_2)^2 P_2^i}{(f_1)^2 - (f_2)^2} \tag{Eq. 2}$$

Since the ionospheric delay of a signal of carrier frequency f experienced when traveling through the ionosphere is proportional to $1/f^2$, the effects of ionospheric delays of the signals of carrier frequencies $f_1$ and $f_2$ cancel in the above combinations $L_c^i$ and $P_c^i$ to good precision. In practice, a cancellation of 99.9% of the effects of ionospheric delays of the signals can be achieved.

If the present position of the rover k is denoted by $\vec{r}_k$ and the clock error of the internal clock of the rover is denoted by $dt_k$, both of which are to be accurately estimated by the PPP technique, the following system of observation equations for the set of n GNSS satellites in view of the rover is obtained:

$$L_c^i + cdt^i - (\rho_0)_k^i = -(\hat{\rho}_0)_k^i \cdot [\vec{r}_k - \vec{r}_{0,k}] + cdt_k + M_k^i \cdot \delta T_k + (B_c)_k^i + \lambda_n w_k + \epsilon \tag{Eq. 3}$$

$$P_c^i + cdt^i - (\rho_0)_k^i = -(\hat{\rho}_0)_k^i \cdot [\vec{r}_k - \vec{r}_{0,k}] + cdt_k + M_k^i \cdot \delta T_k + \epsilon' \tag{Eq. 4}$$

These ionospheric-free observation equations relate the observables obtained at step S1204 to the actual distances of the rover to the GNSS transmitters aboard the GNSS satellites, taking into account instrumental and observational errors. Therein, c is the speed of light in a vacuum, $\rho_0$ is the approximated modeled range between the rover and the respective (i-th) satellite, and $\hat{\rho}_0$ is the corresponding unit length vector along the direction pointing from the approximate position $\vec{r}_{0,k}$ of the rover to the respective (i-th) satellite. Further, M and δT are, respectively, the tropospheric mapping and residual vertical delay, w is the unmodeled user windup and wavelength $\lambda_n$ can be obtained from the carrier frequencies $f_1$ and $f_2$ via $$\lambda_n = \frac{c}{f_1 + f_2}.$$

Finally, ε and ε' respectively represent the phase and code measurement errors associated to thermal noise and multipath, and $B_c$ represents the ionospheric-free carrier-phase ambiguity. The expression "ambiguity" refers to an indeterminable part of the difference between the carrier phase of a GNSS signal measured at the GNSS receiver of the rover at reception time of the signal and the carrier phase measured at the respective GNSS transmitter at transmission time of the signal. For instance, for a given carrier with frequency $f_X$, the ambiguity $B_X^i$ is comprised of an integer part $\lambda_X N_X$ corresponding to an unknown number of full cycles, a first fractional part $\delta B_X^i$ corresponding to an instrumental bias of the GNSS transmitter of the respective satellite (satellite phase bias), and a second fractional part $\delta B_{X,k}$ corresponding to an instrumental bias of the GNSS receiver of the rover (receiver phase bias). Therein, the satellite phase bias indicates a phase offset between the signal generated at the GNSS transmitter and a reference signal based on a reference time frame, and the receiver phase bias indicates a phase offset between a reference signal generated internally in the GNSS receiver and the reference signal based on the reference time frame.

In step S1205, the above system of 2n observation equations is solved by applying a so-called Kalman filter to the system of observation equations. The timing at which signals from all GNSS transmitters of the n GNSS transmitters aboard the satellites in view of the rover are simultaneously received by the GNSS receiver of the rover and are processed is referred to as an "epoch." For each epoch, the above system of 2n observation equations can be typically solved if the number of GNSS satellites in view of the rover is equal to or exceeds n=4. By taking into account solutions from previous epochs, the accuracy of the solutions can be successively increased. In applying the Kalman filter, the rover position $\vec{r}_k$ and the user clock $dt_k$ can be treated as white noise, the residual ("wet") delay δT and the user windup w can be treated as random walk processes, and the ionospheric-free carrier-phase ambiguity $B_c$ is estimated as a random variable ("constant parameter"), with the exception of the occurrence of cycle-slip events. In such a case, $B_c$ is treated as a white noise random process.

The main drawback of the above-described PPP technique is the large convergence time required to obtain a good estimation of the ionospheric-free ambiguity $B_c$, where $B_c$ is to be understood as a shorthand for the set of ambiguities $B_c^i$, and correspondingly for the rover position $\vec{r}_k$. The convergence time can last the best part of one hour—or more—before a high accuracy for the rover position at the level of 1 to 2 decimeters can be obtained.

These problems of the PPP technique limit the application of this technique to a position determination, for which the convergence time is not an issue, such as position determination for slow-moving objects, watercraft or stationary objects. The PPP technique accordingly is not applicable for determining the position of most surface vehicles, such as passenger cars, or most aircraft, such as planes. Furthermore, because of the long convergence time of the PPP technique, a continuous unobstructed view between the rover and the respective GNSS satellites is essential for the reliable operation of the PPP technique. If the tracking of individual or all satellites is lost on time scales shorter than or on the order of the convergence time, no reliable position determination might be possible at all. Therefore, the PPP technique is also not deployable for navigation in densely built areas, such as cities or in other areas in which no continuous unobstructed view between the rover and the respective GNSS satellites is present.

SUMMARY AND INITIAL DESCRIPTION

The present disclosure improves on navigation techniques known in the art and further overcomes the limitations of present GNSS navigation techniques mainly with regard to convergence time.

According to an aspect of the present disclosure, a method for determining a position of an object having a Global Navigation Satellite System (GNSS) receiver is provided, the method comprising the steps of: receiving signals by the GNSS receiver that are transmitted by GNSS transmitters positioned on board satellites that are positioned in view of the object; updating service data in the object, the service data including satellite clock data indicating internal clocks of the satellites, satellite orbit data indicating positions of the satellites, satellite delay code bias data relating to delay code biases of the GNSS transmitters, and ionospheric model data indicating a state of an ionosphere; determining, based on the ionospheric model data, ionospheric delay data indicating corrections relating to delays of the signals, the delays of the signals resulting from a passage of the signals through the ionosphere between transmission of the signals from the GNSS transmitters, and reception of the signals by the GNSS receiver; and determining a position of the object based on the signals, the satellite clock data, the satellite orbit data, the satellite delay code bias data, and the determined ionospheric delay data.

By providing the inventive service data, in particular the satellite clocks, the satellite orbits and the satellite delay code biases, the above method may be carried out independently of reference data provided by a reference GNSS receiver that is receiving signals from the GNSS transmitters aboard the GNSS satellites in view of the user. In the state of the art, such reference data may be used for comparing the signals received by the user to the reference data, thereby being enabled to determine and cancel observation errors that are due to instrumental biases, clock errors, and position errors of the GNSS transmitters. In other words, according to the present disclosure, no double-differencing of signals (or observables obtained from the signals) takes place. Accordingly, a crucial advantage of the present disclosure lies in the fact that a user employing the method is not at all dependent on proximity to a reference GNSS receiver. Thereby, the user can determine his or her position at any point on earth without limitation. Furthermore, by providing an ionospheric model to the user with the inventive service data, the user is enabled to independently determine corrections relating to ionospheric delays of the signals received by the user. Accordingly, the user is enabled to correct for the ionospheric delays of the signals, whereby a main source of uncertainty in the determination of the user position is eliminated and the convergence time that elapses until the user position is accurately determined may be considerably reduced. In summary, the method allows a user to determine his or her position at any point on earth, independently of any external infrastructure, in a quick and accurate manner. Thus, by providing the method, the above-described problems and disadvantages that are present in the discussed prior art techniques are absent in the present disclosure.

The term "delay code bias" used in the context of the present disclosure is also known as "differential code bias." Therefore, in the context of the present disclosure the term "delay code bias data" is meant to refer to "differential code bias data." For each carrier frequency, the corresponding satellite delay code bias is understood as relating to a delay between time-stamped information transmitted with the signal and a reference time frame.

Preferably, in the method described herein, all signals involved in the step of determining the position of the object are processed in an undifferenced mode.

According to another aspect of the present disclosure, the method preferably further comprises the steps of: obtaining code observation data from the signals, the code observation data relating to data transmitted with the signals and comprising code observables relating to data transmitted with the signals; and obtaining carrier-phase observation data from the signals, the carrier-phase observation data relating to carrier phases of the signals and comprising carrier-phase observables relating to the carrier phase of the signals; and the step of determining the position of the object is based on the satellite clock data, the satellite orbit data, the satellite delay code bias data, the ionospheric delay data and the code observation data obtained from the signals, and the carrier-phase observation data obtained from the signals. Preferably, all code observables and all carrier-phase observables involved in the step of determining the position of the object are processed in an undifferenced mode. Correspondingly, in the step of obtaining code observation data from the signals, the code observation data is preferably directly obtainable from the signals alone, and in the step of obtaining carrier-phase observation data from the signals, the carrier-phase observation data is preferably directly obtainable from the signals alone.

Preferably, in the step of determining the position of the object, at least one linear combination of observables that is different from ionospheric-free combinations of observables and an ionospheric-free combination of observables are processed. In other words, preferably at least one non ionospheric-free linear combination of observables and an ionospheric-free linear combination of observables are processed. Preferably, if signals of two different carrier frequencies are received, in the step of determining the position of the object, two linear combinations of observables that are both different from an ionospheric-free combination of observables and the ionospheric-free combinations of observables are processed. Preferably, if signals of three different carrier frequencies are received, in the step of determining the position of the object, three linear combinations of observables that are all three different from ionospheric-free combinations of observables and ionospheric-free combinations of observables are processed.

Preferably, the method may further comprise at least one of the steps of: determining an ionospheric delay for a code observable; determining an ionospheric delay for a carrier-phase observable; determining an ionospheric delay for a geometric-free combination of code observables; and determining an ionospheric delay for a geometric-free combination of carrier-phase observables.

Preferably, the service data further comprises satellite phase bias data relating to carrier-phase biases of the GNSS transmitters, and the step of determining the position of the object further comprises a step of determining carrier-phase ambiguity data indicating for at least one signal a count of full cycles comprised in a phase difference between a carrier phase of the signal at a transmission timing and a carrier phase of the signal at a reception timing based on the carrier-phase observation data and the satellite-phase bias data.

Providing the phase bias data to the user enables the user to fix the respective integer parts of ambiguities and thereby accurately determine ambiguities in the carrier phases with increased accuracy. Since the ambiguities present a main error source affecting the precise positioning convergence time on determining the user position, accurately determining the ambiguities allows for considerable reduction of the precise positioning convergence time of the determined user position.

According to a further aspect of the present disclosure, in the step of determining the position of the object preferably at least one recursive estimation process is executed. Therein, the recursive estimation process may be a filter. Preferably, the recursive estimation process is a Kalman filter. Preferably at each step of the at least one recursive estimation process, state data, comprising at least one of the position of the object and carrier-phase ambiguity data, may be estimated based on the signals, the satellite clock data, the satellite orbit data, the ionospheric delay data, and an estimate of the state data estimated at the previous step. The state data may also comprise at least one of a tropospheric delay and a user windup. Preferably, the at least one recursive estimation process processes at least one of combinations of carrier-phase observables which are substantially affected by the delays of the signals, combinations of code observables which are substantially affected by the delays of the signals, carrier-phase observables which are substantially affected by the delays of the signals, and code observables which are substantially affected by the delays of the signals.

Employing a recursive filter allows successively determining the user position with continuously increasing accuracy.

Further preferably, the ionospheric model data may be indicative of a position-resolved and world-wide status of the ionosphere. Alternatively, the ionospheric model may also be indicative of the position-resolved status of the ionosphere in one or more given regions of the earth. Furthermore, the ionospheric model data may present different levels of accuracy, which may depend on the one or more regions or on the (approximate) position of the user. Preferably, the ionospheric model data comprises ionospheric model reliability data relating to a position-dependent reliability of the ionospheric model data, and the step of determining the position of the object is further based on the ionospheric model reliability data.

The accuracy (reliability) of the ionospheric model may depend on the user position. In such cases, if the user is provided with an indication of the accuracy of the ionospheric model at the current approximate user position, this information may be taken into account in the step of determining the user position. Specifically, in the filtering process, the corrections relating to ionospheric delays of the signals determined from the ionospheric model may be attributed with a weight factor, such that the corrections may be given a higher weight if the accuracy of the ionospheric model is high at the current approximate user position, and may be given a lower weight if the accuracy of the ionospheric model at the approximate user position is low.

According to a further aspect of the present disclosure, if signals of at least two different frequencies are received at the object, the step of determining the position of the object may preferably further comprise the steps of: obtaining for each of the satellites a widelane combination of phases from the carrier-phase observation data and a corresponding narrowlane combination of codes from the code observation data; obtaining for each of the satellites a Melbourne-Wübbena combination of the widelane combination of phases and the corresponding narrowlane combination of codes; estimating for each of the satellites a widelane ambiguity based on the Melbourne-Wübbena combinations and the satellite delay code bias data by way of a first recursive estimation process; obtaining for each of the satellites a geometric-free combination of phases from the carrier-phase observation data; estimating for each of the satellites a geometric-free ambiguity based on the geometric-free combinations and the ionospheric delay data by way of a second recursive estimation process; estimating for each of the satellites an ionospheric-free ambiguity based on the estimate of the corresponding widelane ambiguity and the estimate of the corresponding geometric-free ambiguity; obtaining for each of the satellites an ionospheric-free combination of phases from the carrier-phase observation data and an ionospheric-free combination of codes from the code observation data; and determining the position of the object based on the ionospheric-free combinations of phases, the ionospheric-free combinations of codes, and the estimates of the ionospheric ambiguities by way of a third recursive estimation process.

According to another aspect of the present disclosure, if signals of at least three different frequencies are received at the object, the step of determining the position of the object may preferably further comprise the steps of: obtaining for each of the satellites an extra-widelane combination of phases from the carrier-phase observation data and a corresponding narrowlane combination of codes from the code observation data; obtaining for each of the satellite a Melbourne-Wübbena combination from the extra-widelane combination of phases and the corresponding narrowlane combination of codes; estimating for each of the satellites an extra-widelane ambiguity based on the Melbourne-Wübbena combinations and the satellite delay code bias data by way of a first recursive estimation process; obtaining for each of the satellites a widelane combination of phases from the carrier-phase observation data; estimating for each of the satellites a widelane ambiguity based on the widelane combinations of phases, the extra-widelane combinations, the estimates of the extra-widelane ambiguities, and the ionospheric delay data by way of a second recursive estimation process; obtaining for each of the satellites a geometric-free combination of phases (such as $L_1=L_1-L_2$, also known as ionospheric combination) corresponding to those two frequencies of the three different frequencies having the largest mutual frequency difference from the carrier-phase observation data; estimating for each of the satellites a geometric-free ambiguity based on the geometric-free combinations of phases and the ionospheric delay data by way of a third recursive estimation process; estimating for each of the satellites an ionospheric-free ambiguity based on the corresponding estimate of the widelane ambiguity and the corresponding estimate of the geometric-free ambiguity; obtaining for each of the satellites an ionospheric-free combination of phases corresponding to those two frequencies of the three different frequencies having the largest mutual frequency difference from the carrier-phase observation data, and an ionospheric-free combination of codes corresponding to those two frequencies of the three different frequencies having the largest mutual frequency difference from the code observation data; and determining the position of the object based on the ionospheric-free combinations of phases, the ionospheric-free combinations of codes, and the estimates of the ionospheric ambiguities by way of a fourth recursive estimation process.

Preferably, at least one fixed ground station serves as a central processing facility and a plurality of fixed ground stations that each have a GNSS receiver serve as network stations, the at least one central processing facility and the plurality of network stations form a network, the service data is obtained by the network and transmitted to the object, and obtaining the ionospheric model data comprises the steps of: receiving at the network stations signals transmitted by GNSS transmitters positioned aboard a plurality of satellites arranged in a view of at least one of the network stations; determining network ionospheric delay data indicating corrections relating to delays of the signals received at the network stations, the delays of the signals received at the network stations resulting from a passage of the signals received at the network stations through the ionosphere; and determining the ionospheric model data from the network ionospheric delay data. Preferably, the signals received at the network stations are signals of at least two different frequencies.

Further, the satellite carrier-phase bias data may be obtained based on the signals received at the network stations and continuously transmitted to the object.

According to the present disclosure, determining the ionospheric model data may further comprise the steps of: expanding the number density of free electrons in the ionosphere into a plurality of functions; and estimating electron content data indicating coefficients of the plurality of functions based on the network ionospheric delay data. Preferably, these functions are voxel basis functions such that the ionosphere is subdivided into a plurality of volume cells ("voxels") by applying a grid to the ionosphere, and the coefficients of the voxel basis functions correspond to the amount of free electrons within each volume cell. Alternatively, the functions may also be functions such as empirical orthogonal functions, spherical harmonics, or Chapman profiles.

Providing such an ionospheric model enables the user to determine ionospheric delays of GNSS signals received at a GNSS receiver associated to the user and transmitted by a GNSS transmitter aboard a GNSS satellite in view of the user. Based on an approximate position of the user, a position of the GNSS satellite, which may be obtained from the satellite orbit data, and a density or total content of free electrons along the line of sight between the GNSS receiver and the GNSS transmitter, which may be obtained from the ionospheric model, the user may determine the ionospheric delays of the GNSS signals without further external information.

Preferably, geodetic data relating to at least one of internal clocks of the plurality of satellites, positions of the plurality of satellites, delay code biases of the GNSS transmitters aboard the plurality of satellites and carrier-phase biases of the GNSS transmitters aboard the plurality of satellites, and ionospheric data relating to a state of the ionosphere are processed simultaneously by a first estimation process and a second estimation process, the first and second estimation processes having different processing speeds and interacting with each other.

By virtue of this setup, the determination of data at the CPF that needs to be frequently updated at the user side (e.g., once per epoch), such as satellite clock data, and data that does not need to be updated with such a high refresh rate, such as the ionospheric model, may be decoupled. Accordingly, e.g., precise satellite clock data may be obtained through a first, fast filtering process, while, e.g., the ionospheric model may be obtained through a second, slower filtering process. By providing the output of the second filtering process to the first filtering process, optimal accuracy of the determined data may be achieved. Also, rapidly changing elements of the inventive service data and more slowly changing elements of the inventive service data may be determined in a consistent framework by a single unified process. Thus, both high accuracy for all elements of the service data and high refresh rates for individual elements of the service data, such as the precise satellite clocks, may be obtained, and all elements of the service data may be determined in a consistent framework. Therefore, the above inventive setup allows providing service data of optimal quality to the user, whereby the performance with regard to convergence time and/or position accuracy in determining the user position may be improved. At the same time, the required computational power for determining the inventive service data may be considerably curbed.

According to another aspect of the present disclosure, a satellite clock refresh rate, a satellite orbit data refresh rate, and a ionospheric model refresh rate, respectively indicating a rate with which the satellite clock data is continuously updated at the object, a rate with which the satellite orbit data is continuously updated at the object, and a rate with which the ionospheric model data is continuously updated at the object are chosen such that the satellite clock data refresh rate is larger than the satellite orbit data refresh rate and the satellite clock data refresh is larger than the ionospheric model data refresh rate.

Since, e.g., the accuracy of satellite clocks maintained at the user side rapidly degrades, satellite clock data needs to be frequently transmitted to the user, that is, with a high refresh rate, typically of once per epoch. Contrary to satellite clocks, satellite orbits and other elements of the service data do not degrade that rapidly, and may be transmitted to the user with a lower refresh rate. The ionospheric model for instance needs to be updated with a refresh rate of once every ten minutes, or an even lower refresh rate. By transmitting the individual elements of the service data with individually adapted refresh rates, the bandwidth required for transmitting the service data may be considerably reduced. Typically, in the present disclosure, the bandwidth required for transmitting the service data is 250 bytes per second per constellation.

Further according to the present disclosure, an apparatus is provided, the apparatus comprising: means for receiving signals that are transmitted by GNSS transmitters on board a given number of satellites positioned in view of the apparatus; means for updating service data, the service data comprising satellite clock data indicating internal clocks of the satellites, satellite orbit data indicating positions of the satellites, satellite delay code bias data relating to delay code biases of the GNSS transmitters and ionospheric model data indicating a state of an ionosphere; means for determining, based on the ionospheric model data, ionospheric delay data indicating corrections relating to delays of the signals, the delays of the signals resulting from a passage of the signals through the ionosphere between transmission of the signals from the GNSS transmitters and reception of the signals by the means for receiving signals; and means for determining a position of the apparatus based on the signals, the satellite clock data, the satellite orbit data, the satellite delay code bias data, and the ionospheric delay data.

Preferably, the apparatus further comprises: means for obtaining code observation data from the signals, the code observation data relating to data transmitted with the signals and comprising code observables relating to data transmitted with the signals; and means for obtaining carrier-phase observation data from the signals, the carrier-phase observation data relating to carrier phases of the signals and comprising carrier-phase observables relating to the carrier phase of the signals; and the means for determining the position of the object is further adapted to determine the position of the object based on the satellite clock data, the satellite orbit data, the satellite delay code bias data, the ionospheric delay data and at least one of the code observation data obtained from the signals and the carrier-phase observation data obtained from the signals.

Preferably, all code observables and all carrier-phase observables involved in the step of determining the position of the object are undifferenced observables. Correspondingly, the means for obtaining code observation data from the signals preferably is further adapted to unambiguously obtain the code observation data from the signals alone, and the means for obtaining carrier-phase observation data from the signals preferably is further adapted to unambiguously obtain the carrier-phase observation data from the signals alone.

The apparatus may further comprise at least one of: means for determining an ionospheric delay for a code observable; means for determining an ionospheric delay for a carrier-phase observable; means for determining an ionospheric delay for a geometric-free combination of code observables; and means for determining an ionospheric delay for a geometric-free combination of carrier-phase observables.

Preferably, the means for updating service data is adapted to update service data further comprising satellite phase bias data relating to carrier-phase biases of the GNSS transmitters, and the means for determining the position of the object is further adapted to determine carrier-phase ambiguity data indicating for at least one signal a count of full cycles comprised in a phase difference between a carrier phase of the signal at a transmission timing and a carrier phase of the signal at a reception timing based on the carrier-phase observation data and the satellite-phase bias data.

According to a further aspect of the present disclosure, the means for determining the position of the object is further adapted to execute at least one recursive estimation process. Therein, the recursive estimation process may be a filter. Preferably, the recursive estimation process is a Kalman filter.

The means for determining the position of the object may be further adapted to, at each step of the at least one recursive estimation process, estimate state data comprising at least one of the position of the object and carrier-phase ambiguity data, based on the signals, the satellite clock data, the satellite orbit data, the ionospheric delay data, and an estimate of the state data estimated at the previous step. The state data may also comprise at least one of a tropospheric delay and a user windup. Preferably, the at least one recursive estimation process processes at least one of combinations of carrier-phase observables which are substantially affected by the delays of the signals, combinations of code observables which are substantially affected by the delays of the signals, carrier-phase observables which are substantially affected by the delays of the signals, and code observables which are substantially affected by the delays of the signals.

According to a further aspect of the present disclosure, a system comprising the above apparatus and a network formed by at least one central processing facility that is a fixed ground station and a plurality of network stations that are fixed ground stations that each have a GNSS receiver is provided, wherein the network is adapted to obtain the service data and transmit the service data to the apparatus. Preferably, the central processing facility comprises means for obtaining the service data. Further preferably, the central processing facility comprises means for transmitting the service data to the apparatus.

Preferably, the network stations comprise means for receiving signals transmitted by GNSS transmitters positioned aboard a plurality of satellites arranged in a view of at least one of the network stations, and the central processing facility comprises: means for determining network ionospheric delay data indicating corrections relating to delays of the signals received at the network stations, the delays of the signals received at the network stations resulting from a passage of the signals received at the network stations through the ionosphere; and means for determining the ionospheric model data from the network ionospheric delay data. Therein, the signals received by the means for receiving signals preferably are signals of at least two different frequencies.

According to the present disclosure, the central processing facility may further comprise: means for expanding the number density of free electrons in the ionosphere into a plurality of functions; and means for estimating electron content data indicating coefficients of the plurality of functions based on the network ionospheric delay data. Preferably, these functions are voxel basis functions such that the ionosphere is subdivided into a plurality of volume cells ("voxels") by applying a grid to the ionosphere and the coefficients of the voxel basis functions correspond to the amount of free electrons within each volume cell. Alternatively, the functions may also be functions such as empirical orthogonal functions, spherical harmonics or Chapman profiles.

Preferably, the central processing facility comprises: first processing means for processing geodetic data relating to at least one of internal clocks of the plurality of satellites, positions of the plurality of satellites, delay code biases of the GNSS transmitters aboard the plurality of satellites and carrier-phase biases of the GNSS transmitters aboard the plurality of satellites; and second processing means for processing ionospheric data relating to a state of the ionosphere, wherein the first processing means is configured to execute a first estimation process and the second processing means is configured to execute a second estimation process, the first and second estimation processes having different processing speeds and interacting with each other.

The means for transmitting the service data to the apparatus may be configured such that a satellite clock refresh rate, a satellite orbit data refresh rate and an ionospheric model refresh rate, respectively indicating a rate with which the satellite clock data is continuously updated at the object, a rate with which the satellite orbit data is continuously updated at the object, and a rate with which the ionospheric model data is continuously updated at the object are chosen such that the satellite clock data refresh rate is larger than the satellite orbit data refresh rate, and the satellite clock data refresh is larger than the ionospheric model data refresh rate.

BRIEF DESCRIPTION OF THE FIGURES

The present disclosure will now be described in detail with reference to the attached drawings, among which.

DETAILED DESCRIPTION

By way of illustration without in any way limiting its scope, in the following, focus will be put to the preferred embodiments of the present disclosure. Definitions of technical terms given in the following are meant for purely illustrative purposes without intended limitations of the scope of the present disclosure.

Figure 1:
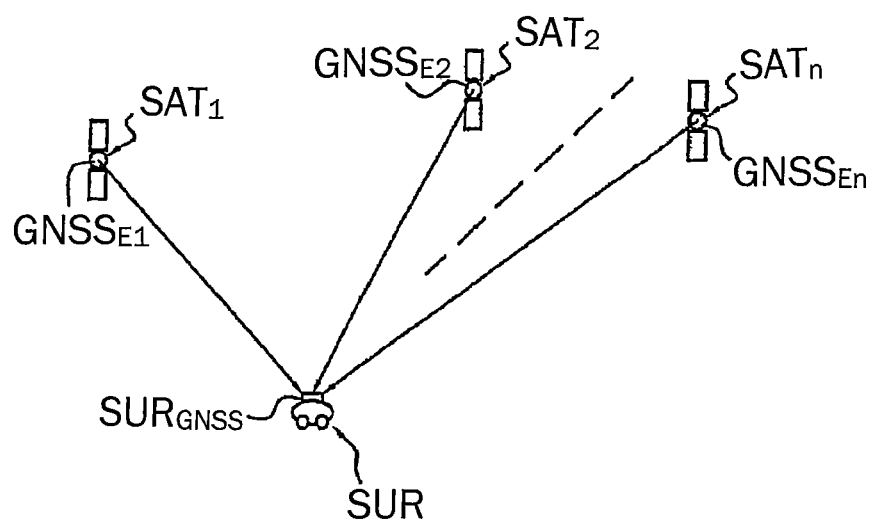
FIG. 1 schematically illustrates a navigation system for implementing the method of the present disclosure showing a rover and a number of satellites in view of the rover.

FIG. 1 shows a rover SUR having a GNSS receiver $SUR_{GNSS}$, and a number of satellites $SAT_1$ to $SAT_n$, each provided with a GNSS transmitter $GNSS_{E1}$ to $GNSS_{En}$. The GNSS transmitters $GNSS_{E1}$ to $GNSS_{En}$ transmit signals comprising a carrier wave of a predetermined carrier frequency as well as time-stamped information constituted by a pseudo-random code that is superimposed on the carrier wave. Each of the GNSS transmitters $GNSS_{E1}$ to $GNSS_{En}$ may transmit signals of different carrier frequencies. For instance, among other systems, the present disclosure is applicable to the Global Positioning System (GPS), the Galileo system, or the modernized GPS. Therein, GPS transmitters transmit signals of two different carrier frequencies, while the modernized GPS and Galileo transmitters transmit signals of three or more different carrier frequencies. The signals transmitted by the GNSS transmitters $GNSS_{E1}$ to $GNSS_{En}$ subsequently are received by a GNSS receiver $SUR_{GNSS}$ aboard the rover SUR. In the above, it is understood that the signals transmitted by the GNSS transmitters $GNSS_{E1}$ to $GNSS_{En}$ are transmitted continuously. A timing at which signals from all GNSS transmitters $GNSS_{E1}$ to $GNSS_{En}$ aboard the satellites $SAT_1$ to $SAT_n$ in view of the rover SUR are simultaneously received by the GNSS receiver $SUR_{GNSS}$ of the rover SUR and are processed is referred to as an "epoch." The time interval between epochs may be chosen arbitrarily, for example, a second of reference standard time. However, alternative durations for time intervals between epochs are explicitly comprised by the scope of the present disclosure. In addition to the signals transmitted by the GNSS transmitters $GNSS_{E1}$ to $GNSS_{En}$, the rover also receives service data that may, for instance, be transmitted by a Central Processing Facility, or "CPF," comprised by a network of fixed ground stations (not shown in the figure).

Figure 2:
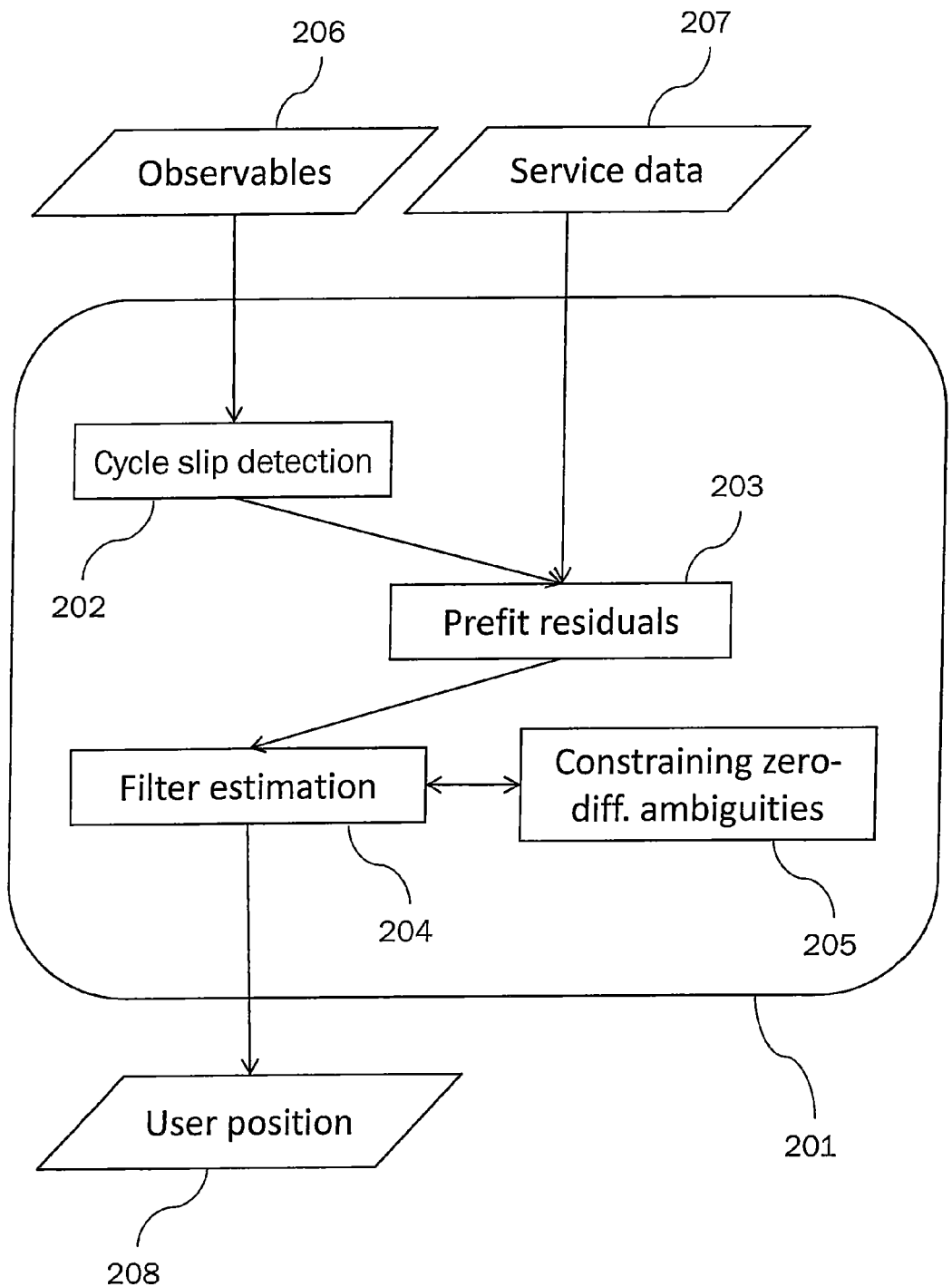
FIG. 2 schematically illustrates an outline of the inventive method for determining a position of a rover.

FIG. 2 schematically illustrates an outline of a user position determination according to the present disclosure. A user 201 is provided with observables 206 derived from GNSS signals received by a GNSS receiver. Equivalently, the user 201 may be provided with the GNSS signals themselves as received by the GNSS receiver. The provided observables 206 then are subjected to cycle-slip detection, detecting loss of tracking locks for one or more satellites, and unless a cycle slip has been detected, pre-fit residuals 203 are determined based on the provided observables and service data 207 provided to the user by a service provider. It occurs to the expert skilled in the art that the user is associated to an apparatus for carrying out the above procedures. In particular, it is understood that such an apparatus comprises means for receiving GNSS signals such as a GNSS receiver, means for obtaining observables from the received GNSS signals, means for receiving service data, means for performing a cycle slip detection and means for obtaining pre-fit residuals.

The service data 207 comprise precise satellite clocks (satellite clock data indicating internal clocks of the satellites), precise satellite orbits (satellite orbit data indicating positions of the satellites), delay code biases of the GNSS transmitters aboard the satellites (satellite delay code bias data indicating delay code biases of the GNSS transmitters), and an ionospheric model (ionospheric model data indicating a state of the ionosphere). The precise clocks according to the present disclosure have a slightly better accuracy (about 6 cm when translated into a position accuracy) thanks to the ambiguity fixing that is performed in the process of determining the precise clocks (see below), in comparison to the clocks used in the conventional PPP method (about 8 cm when translated into a position accuracy). The precise orbits according to the present disclosure have a similar accuracy (about 5 cm when translated into a position accuracy), in comparison to the orbits used in the conventional PPP method. The satellite delay code biases relate to instrumental delays of the GNSS transmitters aboard the GNSS satellites. For each carrier frequency, the corresponding satellite delay code bias relates to a delay between the time-stamped information transmitted with the signals and a reference time frame.

Herein, and in the following, it is understood that the term "service data" refers to any kind of data that is received by the user, and that is different from the GNSS signals transmitted by GNSS transmitters aboard GNSS satellites. It is further pointed out that herein and in the following the service data does not comprise observables and/or signals obtained at other GNSS receivers. As a consequence, the application of the inventive method is independent from proximity to a reference GNSS receiver. Further, the bandwidth required for transmitting the service data is considerably reduced with respect to the case in which reference observables and/or signals are transmitted with the service data.

In addition to the above elements, the service data 207 may also comprise satellite fractional part ambiguities (satellite-phase bias data relating to carrier-phase biases of the GNSS transmitters), for each signal of a given carrier frequency relating to an offset of the carrier phase with respect to a reference time frame.

The ionospheric model comprised by the service data 207 indicates a content of free electrons in the ionosphere. Free electrons in the ionosphere mainly are generated through the radiation of the sun. Since the radiation of the sun varies with time and is different at different points of the ionosphere, the density of free electrons in the ionosphere is both time-dependent and position-dependent. In addition, the ionosphere does not follow the earth's rotation, which results in a further time-dependence of the state of the ionosphere if a coordinate system that is fixed with reference to the earth is considered. The ionospheric model provides information that is sufficient for determining a density of free electrons for a given position within the ionosphere or for a volume cell of predetermined size within the ionosphere. For instance, the ionosphere may be subdivided into a plurality of volume cells or "voxels" arranged on several layers enclosing the earth, and the ionospheric model may comprise the total amount of free electrons for each volume cell. Furthermore, the density function of free electrons in the ionosphere may be expanded into a plurality of functions, such as empirical orthogonal functions, spherical harmonics, or Chapman profiles, and the ionosphere model may comprise the coefficients of these functions. It is understood that the listing of these functions is only of exemplary nature and that it occurs to the expert skilled in the art that also other functions beyond the above-mentioned functions may be used to subdivide the ionosphere. Based on the information provided to the user by way of the ionospheric model, an integrated content of free electrons along the line of sight between the GNSS receiver and a GNSS transmitter aboard a GNSS satellite in view of the GNSS receiver or a content of free electrons inside a cylinder aligned with the line of sight and having a cross-sectional area of, for instance, a square meter ($m^2$) may be determined. Commonly, a content of $10^{16}$ free electrons in such a cylinder is referred to as a Total Electron Content Unit (TECU).

The pre-fit residuals 203 obtained from the observables 206, and the service data 207 is used to perform a filter estimation 204, which allows determining the user position 208. More details relating to the pre-fit residuals 203 and the filter estimation 204 will be given below. In order to increase the accuracy of the determined user position 208 and to reduce the convergence time required for carrying out the filter estimation 204, the satellite fractional part ambiguities comprised by the service data 207 may be used for constraining zero-difference ambiguities 205 relating to carrier-phase observables or linear combinations of observables involving carrier-phase observables. Accordingly, the apparatus associated to the user further comprises means for obtaining pre-fit residuals and means for performing a filter estimation. Therein, the means for obtaining pre-fit residuals and the means for performing the filter estimation may be independent, or may be part of a means for determining the user position.

An embodiment of the present disclosure in which GNSS signals of two different carrier frequencies are received by a user and processed in order to determine the user's position will be described next with reference to FIG. 3.

Therein, it is understood that signals of an arbitrary number of different carrier frequencies may be transmitted by the GNSS transmitters aboard the GNSS satellites in view of the user, but that the GNSS receiver at the user side may be limited to receiving signals of two different carrier frequencies only. Also, it may be the case that the GNSS receiver at the user side may receive signals of an arbitrary number of different carrier frequencies, but that only signals of two different carrier frequencies may be processed at the user side.

In step S301, service data 310 which is preferably transmitted by a CPF is received. Preferably, the CPF is associated to a service provider. The service data 310 comprises precise satellite clocks (satellite clock data indicating internal clocks of the GNSS satellites), precise satellite orbits (satellite orbit data indicating positions of the GNSS satellites), satellite delay code biases (satellite delay code bias data relating to delay code biases of the GNSS transmitters), and the ionospheric model (ionospheric model data indicating a state of the ionosphere). The service data 310 may further comprise satellite fractional part ambiguities (satellite phase bias data relating to carrier-phase biases of the GNSS transmitters. Since the different elements of the service data 310 change over different time scales, they may be transmitted and received with different refresh rates. For instance, the accuracy of the satellite clocks maintained at the user-side rapidly degrades in the absence of fresh input, while the state of the ionosphere typically changes with a time scale of hours, or at least of tens of minutes. Accordingly, the satellite clocks may be transmitted with the highest refresh rate, preferably at each epoch, the satellite orbits may be transmitted with a reduced refresh rate, preferably every few minutes, the satellite delay code biases and satellite fractional part ambiguities may be transmitted with a further reduced refresh rate, preferably every several minutes, and the ionospheric model may be transmitted with a similar refresh rate of few minutes.

In step S302, signals of two different carrier frequencies transmitted by GNSS transmitters aboard a number of GNSS satellites in view of the user are received by a GNSS receiver associated with the user. In the following, the two different carrier frequencies will be denoted $f_1$ and $f_2$. If n denotes the number of GNSS satellites in view of the user, 2n signals are received at this step.

In step S303, observables are obtained from the satellite signals received in step S302. For each signal of carrier frequency f, a carrier-phase observable L and a code observable P may be obtained. Accordingly, for two different carrier frequencies denoted $f_1$ and $f_2$, n carrier-phase observables $L_1^i$, n carrier-phase observables $L_2^i$, n code observables $P_1^i$, and n code observables $P_2^i$ may be obtained at this step, where the lower index denotes the carrier frequency $f_1$ or $f_2$ of the corresponding signal and the upper index $i=1, \ldots, n$ denotes the corresponding GNSS transmitter (or equivalently, the corresponding GNSS satellite).

When a radio signal such as a GNSS signal travels through the ionosphere, it experiences a delay, a so-called ionospheric delay. In a case in which the GNSS signal is delayed, the carrier phase measured at a GNSS receiver receiving the GNSS signal is changed from the case in which the GNSS signal is not delayed. Therefore, a carrier-phase observable obtained from the delayed GNSS signal is also affected by the ionospheric delay of the GNSS signal and itself experiences an ionospheric delay. Also a code observable obtained from the GNSS signal relating to the time-stamped information transmitted with the GNSS signal is affected by the ionospheric delay of the GNSS signal and therefore the code observable itself experiences an ionospheric delay.

In step S304 ionospheric delays of the signals and/or observables are determined. Based on the ionospheric model, the integrated content of free electrons along the line of sight between the GNSS receiver and a GNSS transmitter aboard a GNSS satellite in view of the GNSS receiver or a content of free electrons inside a cylinder aligned with the line of sight and having a cross-sectional area of, for instance, a square meter ($m^2$) may be determined. The ionospheric delay of a GNSS signal of carrier frequency f depends on the total free electron content along the line of sight between the GNSS receiver and the GNSS transmitter, and is inversely proportional to the square of the frequency f. For example, for a GNSS signal of carrier frequency f=1.575 GHz (the $L_1$ band of GPS) a total electron content of 0.26 TECU, results in a delay of the signal of 4 cm or correspondingly a delay of 133 picoseconds. Accordingly, the ionospheric delay of a GNSS signal may be determined from, e.g., the total free electron content along the line of sight between the GNSS receiver and the GNSS transmitter or a content of free electrons inside a cylinder aligned with the line of sight and having a cross-sectional area of, for instance, a square meter ($m^2$). From the delay of the GNSS signal, the ionospheric delays of carrier-phase observables and code observables obtained from the GNSS signal may be obtained in a straightforward manner, and therefrom the ionospheric delays of linear combinations of the carrier-phase observables and code observables may be obtained in turn.

The ionospheric model may be provided with reliability data indicating, for each position of the earth, the reliability of the ionospheric model at this position. As will be discussed below, the ionospheric model is obtained by a network of fixed ground stations each having a GNSS receiver and being associated to a central processing facility. In regions where the network of fixed ground stations is dense, the ionospheric model can be determined with high accuracy (high reliability), whereas in regions in which the network of fixed ground stations is less dense, the ionospheric model is determined with less accuracy (less reliability). In a case in which the ionospheric model is provided with reliability data, the accuracy (reliability) of the ionospheric delays determined from the ionospheric model may be determined. In subsequent steps, when performing a filter estimation, the accuracy of the ionospheric delays determined from the ionospheric model may be taken into account.

A determination of the position of the user based on the signals received at step S302, the satellite clocks, the satellite orbits, the satellite delay code biases received at step S301, and the ionospheric delays determined at step S304 will now be described with reference to steps S305 to S309.

In step S305, first linear combinations of the observables are obtained from the observables. For each GNSS transmitter, one such first linear combination of observables obtained at step S303 is obtained. Accordingly, a total of n first linear combinations are obtained. In the following, whenever a linear combination of observables is obtained for each GNSS transmitter, it will simply be referred to as a linear combination of observables. For conciseness, by "linear combination" or "combination," a set of n distinct linear combinations is understood. The same terminology will in the following also be applied to observables, linear combinations of observables, ambiguities or the like, such that, if not indicated otherwise, each of these expressions respectively refers to a set of n (that is, one for each GNSS satellite) observables, linear combinations of observables, ambiguities or the like.

According to the present disclosure, the first linear combination of observables obtained at step S305 is different from the ionospheric-free combinations. Therefore, the first linear combination of observables is substantially affected by ionospheric delays.

Preferably, the first linear combination has a wavelength that is larger than the wavelengths $\lambda_1 = c/f_1$ and $\lambda_2 = c/f_2$ of the GNSS signals of carrier frequencies $f_1$ and $f_2$, respectively.

Further preferably, the wavelength of the first linear combination is the maximum wavelength obtainable for a linear combination of observables relating to carrier frequencies $f_1$ and $f_2$. If a first linear combination with a large wavelength is formed, ionospheric delays of the first linear combinations do not necessarily have to be taken into account at this step and the following steps. However, taking into account corrections that are due to the ionospheric delays of the first linear combinations at this step and the following steps is understood to be within the scope of the present disclosure.

While a number of different linear combinations of observables can be formed at step S305, according to the present disclosure the first linear combination of observables preferably is a Melbourne-Wübbena combination $L_w{}^i - P_n{}^i$ of widelane carrier-phase observables $L_w{}^i$ and widelane code observables $P_n{}^i$ (sometimes also referred to as narrowlane code observables). A more detailed description of the Melbourne-Wübbena combination can be found in the articles *"The case for ranging GPS-based geodetic systems,"* by W. G. Melbourne, published in *"Proceedings of first international symposium on precise positioning with the global positioning system,"* U.S., pp. 373-386, 1985, and *"Software developments for geodetic positioning with GPS using TI-4100 code and carrier measurements,"* by G. Wübbena, ibid., pp. 403-412, 1985. The widelane carrier-phase observables $L_w{}^i$ and widelane code observables $P_n{}^i$ are obtained from the observables obtained at step S303 by:

$$L_w^i = \frac{f_1 L_1^i - f_2 L_2^i}{f_1 - f_2} \quad \text{(Eq. 5)}$$

$$P_n^i = \frac{f_1 P_1^i + f_2 P_2^i}{f_1 + f_2} \quad \text{(Eq. 6)}$$

In step S306, a first ambiguity relating to the first linear combination of observables is estimated. From the first linear combination, a system of n observation equations may be obtained. By inputting delay code biases obtained from the delay code bias data and by applying a recursive estimation process to the system of n observation equations, the system can be solved and an ambiguity of the first linear combination of observables can be estimated. According to the present disclosure, the first ambiguity, which is the ambiguity of the first linear combination of observables, is different from the ionospheric-free ambiguity. Preferably, the recursive estimation process is a filter, and more preferably, the filter is a Kalman filter. Herein, a recursive estimation process is a process in which wherein at each step of the process data, for instance, comprising the user position and/or a carrier-phase ambiguity is estimated based on the signals, the satellite clock data, the satellite orbit data, the ionospheric delay data, and an estimate of the data estimated at the previous step.

In step S306, in the case of the first combination of observables being the Melbourne-Wübbena combination $L_w{}^i - P_n{}^i$, a specific relation between the Melbourne-Wübbena combination, the satellite delay code biases $D^i$, the receiver delay code bias $D_k$ and the widelane ambiguity $B_w{}^i$ holds, and the following system of n observation equations is obtained:

$$L_w^i - P_n^i + \frac{\lambda_w \lambda_n}{\lambda_1 \lambda_2} D^i = B_w^i - \frac{\lambda_w \lambda_n}{\lambda_1 \lambda_2} D_k \quad \text{(Eq. 7)}$$

Therein, the wavelengths $\lambda_w$ and $\lambda_n$ are $\lambda_w = c/(f_1 - f_2)$ and $\lambda_n = c/(f_1 + f_2)$, and the satellite delay code biases $D^i$ (included in the service data received at step S301) are associated to the geometric-free combination. By applying a recursive estimation process, preferably a filter, more preferably a Kalman filter, to the system of n Equation 7, every widelane ambiguity $B_w{}^i$ can be expressed as a function of the receiver delay code bias $D_k$ which can be treated as part of the receiver clock. Therein, as indicated above, the expression "widelane ambiguity" is understood to refer to the set of n widelane ambiguities $B_w{}^i$ corresponding to the GNSS transmitters aboard the GNSS satellites in view of the user. Obtaining the widelane ambiguity $B_w$ in this manner is feasible thanks to the very good properties of the Melbourne-Wübbena combination $L_w - P_n$, in particular its long wavelength and the low noise for the widelane code observable $P_n$.

In step S307, a second linear combination of observables is obtained from the observables obtained at step S303. As in step S305, for each GNSS transmitter, one such second linear combination of observables having been obtained at step S303 is obtained. It is understood that the first linear combination and the second linear combination are linear independent combinations, that is, that neither is a multiple of the other. A total of n second linear combinations are obtained at this step. Also the second linear combination of observables is different from the ionospheric-free combination and is thus substantially affected by ionospheric delays. Preferably, the second linear combination has a wavelength shorter than that of the first linear combination. In such a case, because of the shorter wavelength, the ionospheric delays of the second linear combination have to be taken into account when estimating an ambiguity of the second linear combination. More specifically, according to the present disclosure, the second linear combination of observables is given by $L_I = L_1 - L_2$, and is commonly referred to as the ionospheric phase $L_I$.

In step S308, a second ambiguity relating to the second linear combination of observables is estimated. From the second linear combination, a system of n observation equations may be obtained. By applying a recursive estimation process to the system of n observation equations, the system can be solved and an ambiguity of the second linear combination of observables can be estimated. According to the present disclosure, the second ambiguity, which is the ambiguity of the second linear combination of observables, is different from the ionospheric-free ambiguity. Preferably, the recursive estimation process is a filter, and more preferably, the filter is a Kalman filter. In the present embodiment, in which the second linear combination of observables is the ionospheric phase $L_I$, a relation giving rise to the following system of n observation equations holds:

$$L_I^i - S^i = B_I^i + (\lambda_1 - \lambda_2) w_k \quad \text{(Eq. 8)}$$

Therein, the quantities $S^i$ indicate the so-called ionospheric delays of the ionospheric phases $L_I^i$, $B_I^i$ are the ionospheric carrier-phase ambiguities, and $w_k$ is the user windup. The so-called slant ionospheric delays $S^i$ parameterize the impact of the ionospheric delays of the GNSS signals transmitted by the GNSS transmitters aboard the GNSS satellites in view of the user on the ionospheric phases $L_I^i$.

Numerical expressions for the ionospheric delays of the second linear combinations of observables, or equivalently, of the corresponding corrections of the second linear combinations of observables may be obtained from the ionospheric delays determined in step S304.

In the present example, the ionospheric delays (slant ionospheric delays) $S^i$ of the ionospheric phase $L_I$ relating to each of the n GNSS transmitters are obtained from the ionospheric delays determined at step S304.

As in step S306, exemplarily relating to the Melbourne-Wübbena combination, in step S308, a recursive estimation method, preferably a filter is applied, more preferably a Kalman filter, is applied to a system of n observation equations relating to the second linear combination of observables in order to estimate a second ambiguity relating to the second linear combination of observables. According to the present disclosure, in step S308 the system of n observation Equation 8 is solved in order to estimate the ionospheric ambiguity $B_I$. Since the main uncertainty in Equation 8, namely the slant ionospheric delays $S^i$ have been precisely determined from the ionospheric model, estimating the ionospheric ambiguity $B_I$ proceeds very rapidly.

Having knowledge of the first ambiguity and the second ambiguity relating to the first linear combination and the second linear combination, respectively, a third ambiguity relating to an arbitrary third linear combination of observables may be calculated. In the above example according to the present disclosure in step S309, the ionospheric-free ambiguity $B_c$ is calculated from the widelane ambiguity $B_w$ and the ionospheric ambiguity $B_I$ through $$B_c = B_w - \frac{\lambda_w \lambda_n}{\lambda_1 \lambda_2} B_I \qquad \text{(Eq. 9)}$$

Having obtained the ionospheric-free ambiguity, the determination of the user position may proceed according to the steps known from the conventional PPP technique. That is, the determination of the user position may proceed according to steps S1204 and S1205 of FIG. 10. Therein, the ionospheric-free combination of observables is obtained and a recursive estimation process, preferably a filter, more preferably a Kalman filter is applied to determine the user position based on the ionospheric-free combinations of observables $L_c$, $P_c$ and the ionospheric-free ambiguity $B_c$ determined above. Since the ionospheric-free ambiguity $B_c$ is already known from step S309, according to the present disclosure, the determination of the user position from the ionospheric-free combination of observables proceeds very rapidly.

To summarize the above, the knowledge of the ionospheric delays of the observables, as are obtained from the ionospheric model, allow processing linear combinations of observables that may not be ionospheric-free and at the same time may have a short wavelength, and which are therefore substantially affected by ionospheric delays. The ionospheric delays obtained from the ionospheric model are used to correct for the ionospheric delays of the observables and/or of the linear combinations of observables. Being thus able to process linear combination of observables that are not ionospheric-free allows obtaining the ionospheric-free ambiguity in a rapid fashion, by subtracting the corrected carrier-phase linear combination from the ionospheric-free carrier phase, thereby eliminating the bottle neck of the conventional PPP technique.

It is pointed out that in the above all signals and observables are processed in an undifferenced mode. This means that no differences between signals received at the GNSS receiver and signals received at other GNSS receivers are taken, or correspondingly, that no differences between observables obtained from the signals received at the GNSS receiver and observables obtained from the signals received at the further GNSS receiver are taken. In other words, for carrying out the method described on the basis of FIG. 3, no further (reference) GNSS receiver that transmits data relating to signals received at the further GNSS receiver and/or data relating to observables obtained from the signals received at the further GNSS receiver is required. In other words, for carrying out the above method, no input apart from the GNSS signals 311 received at the GNSS receiver and the service data 310 is required.

Therefore, determining the position of the rover with high accuracy is possible globally (at decimeter error level), at any given position on the earth, and with quick convergence (after few minutes), particularly in regions where a precise enough ionospheric model (with uncertainty in the ionospheric delay up to about several cm in $L_1$) can be available.

In the above, it occurs to the expert skilled in the art that the order of certain steps may be reversed. For instance, as already mentioned, steps S301 and S302 may be interchanged, and also step S305 together with step S306 may be interchanged with step S307 together with step S308. Also step S303 in which observables are obtained from the satellite signals may be merged with step S305 and/or step S307, such that the first and/or second linear combinations of observables are obtained directly from the satellite signals. Furthermore, the first and second linear combinations of observables in the above may also be trivial combination in the sense that a linear combination of observables may in fact relate to a single observable itself.

An apparatus for carrying out the above-described steps according to the present embodiment of the present disclosure may comprise all or some of the following elements: means for receiving service data, means for receiving GNSS signals, means for obtaining observables from the GNSS signals, means for determining ionospheric delays of the GNSS signals from an ionospheric model, means for obtaining a first linear combination of observables, means for obtaining a second linear combination of observables, means for applying one or more recursive estimation processes, means for obtaining an ionospheric-free linear combination of observables, and means for determining a position of the user.

An embodiment of the present disclosure in which signals of two different carrier frequencies are received and processed in order to determine the user's position, and in which the service data 410 further comprises satellite-phase bias data relating to carrier-phase biases of the GNSS transmitters will be described next with reference to FIG. 4. Unless stated otherwise, details of the steps discussed below with reference to FIG. 4 are identical to the details of the corresponding steps discussed above with reference to FIG. 3.

Figure 3:
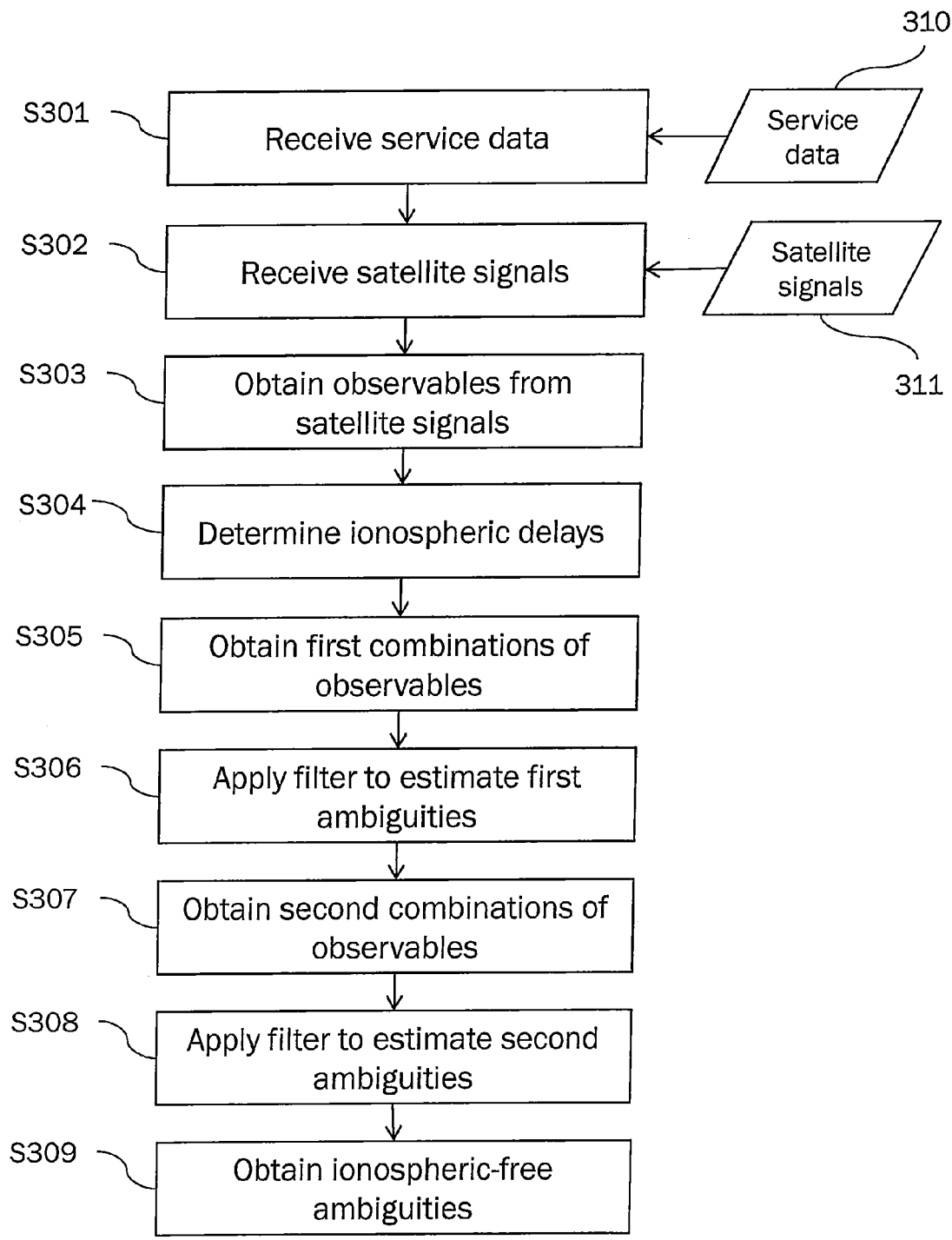
FIG. 3 shows a schematic flow diagram illustrating an embodiment of the present disclosure.
Figure 4:
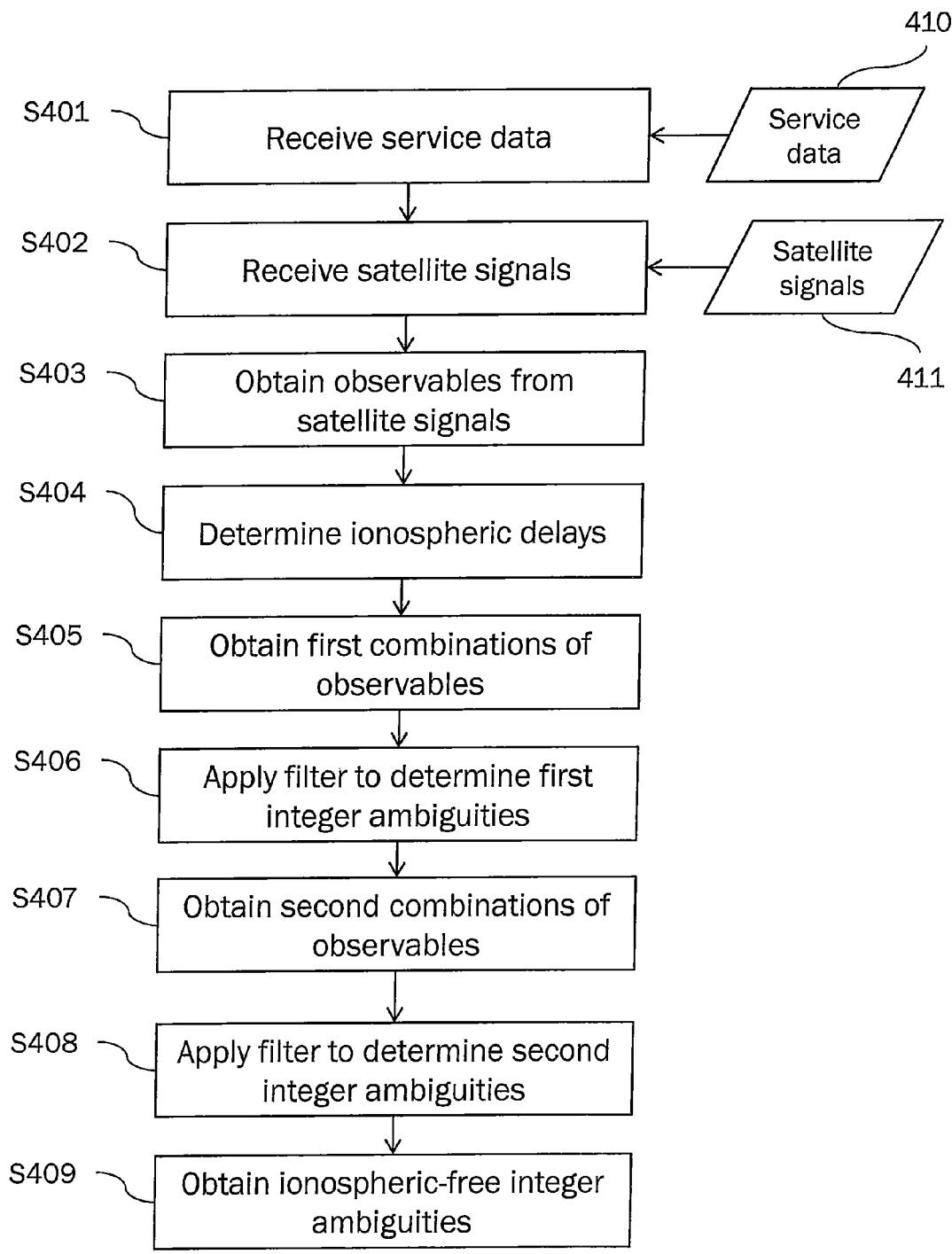
FIG. 4 shows a schematic flow diagram illustrating another embodiment of the present disclosure.

Further, in analogy to the embodiment of FIG. 3, it is understood that signals of an arbitrary number of different carrier frequencies may be transmitted by the GNSS transmitters aboard the GNSS satellites in view of the user, but that the GNSS receiver at the user side is limited to receiving signals of two carrier frequencies only. Also, it may be the case that the GNSS receiver at the user side may receive signals of an arbitrary number of different carrier frequencies, but that only signals of two different carrier frequencies are processed at the user side.

In step S401, service data 410, which is preferably transmitted by a CPF, is received. Preferably, the CPF is associated with a service provider. The service data 410 comprises precise satellite clocks (satellite clock data indicating internal clocks of the GNSS satellites), precise satellite orbits (satellite orbit data indicating positions of the GNSS satellites), satellite delay code biases (satellite delay code bias data relating to delay code biases of the GNSS transmitters), and the ionospheric model (ionospheric model data indicating a state of the ionosphere), and satellite fractional part ambiguities (satellite-phase bias data relating to carrier-phase biases of the GNSS transmitters). The satellite fractional part ambiguities may for instance relate to the fractional parts $\delta B_1^i$ and $\delta B_2^i$ of the respective GNSS transmitter.

Steps S402 to S405 are equivalent to steps S302 to S305 in FIG. 3 discussed above.

In step S406 of the present embodiment, the first ambiguities are not only estimated, but fixed to their actual values. According to the present disclosure, the first ambiguities, which are the ambiguities of the first linear combinations of observables, are different from the ionospheric-free ambiguities. To this end, the first ambiguities are initially estimated in the same manner as in step S306 in FIG. 3. As has been discussed with reference to step S1204 in FIG. 10, the first ambiguity $B_X^i$, where X indicates the first linear combination of observables is comprised of an integer part $\lambda_X N_X^i$, a first fractional part $\delta B_X^i$ relating to instrumental biases of the respective GNSS transmitter, and a second fractional part $\delta B_{X,k}$ relating to instrumental biases of the GNSS receiver. In the present embodiment of the present disclosure, the first fractional part $\delta B_X^i$, or correspondingly the first fractional parts $\delta B_1^i$ and $\delta B_2^i$ relating to carrier frequencies $f_1$ and $f_2$, are transmitted with the service data 410. After the first ambiguity $B_X^i$ has been estimated by way of the recursive estimation process, which is preferably a filter, and more preferably a Kalman filter, the user may apply the following relationship:

$$B_X^i - \delta B_X^i = \lambda_X N_X^i + \delta B_{X,k} \qquad \text{(Eq. 10)}$$

In this equation, the first fractional parts $\delta B_X^i$ are known from the service data 410. The second fractional parts $\delta B_{X,k}$ can be obtained by comparing first ambiguities $B_X^i$ relating to different GNSS transmitters, or correspondingly GNSS satellites and can afterwards be canceled from the set of Equation 10. Taking into account that the integer parts $\lambda_X N_X^i$ are integer multiples of the wavelength $\lambda_X$ relating to the first linear combination of observables allows for fixing the integer parts $\lambda_X N_X^i$ of the second ambiguities $B_X^i$ (notice that this procedure is equivalent to forming single differences between satellites). In detail, this fixing is performed by estimating an ambiguity $B_X^i$, subtracting the first fractional part of the ambiguity $\delta B_X^i$ as received with the service data 410 and the second fractional part of the ambiguity $\delta B_{X,k}$ as obtained above. The remainder then is divided by the wavelength $\lambda_X$, and the result of the division is rounded to the nearest integer number, yielding the number of full cycles $N_X^i$. Thereby, the first ambiguity $B_X^i$ may be accurately determined. Referring to the example of the embodiment described with reference to FIG. 3, in the present embodiment in step S406 the widelane ambiguity $B_w$ may be accurately determined by fixing its integer part. However, it is understood that fixing the ambiguity is not necessarily required for determining the position of the user, but considerably helps to reduce the convergence time in the determination of the accurate user position. This is because a prompt estimation of an accurate enough $B_c$ (see the above Equation 9 of $B_c$ in terms of $B_w$ and $B_I$) is achieved due to the knowledge of the exact value of $B_w$.

Step S407 is equivalent to step S307 in FIG. 3 discussed above.

In step S408, the second ambiguities may be fixed to their actual values. Therein, the fixing of the second ambiguities proceeds equivalently to the fixing of the first ambiguities as described with reference to step S406. According to the present disclosure, the second ambiguities, which are the ambiguities of the second linear combinations of observables, are different from the ionospheric-free ambiguities. In the example of the present disclosure, in step S408 the ionospheric ambiguity $B_I$ is fixed.

From thereon, the method of FIG. 4 proceeds as described above with reference to FIG. 3. In step S409, the ionospheric-free ambiguity $B_c$ is obtained. Following step S409, the method proceeds according to steps S1204 and S1205 as discussed with reference to FIG. 10. Therein, the ionospheric-free combination of observables is obtained and a recursive estimation process, preferably a filter, more preferably a Kalman filter is applied to determine the user position. Since the ionospheric-free ambiguity $B_c$ is already known from step S409, the determination of the user position from the ionospheric-free combination of observables proceeds very rapidly.

Figure 10:
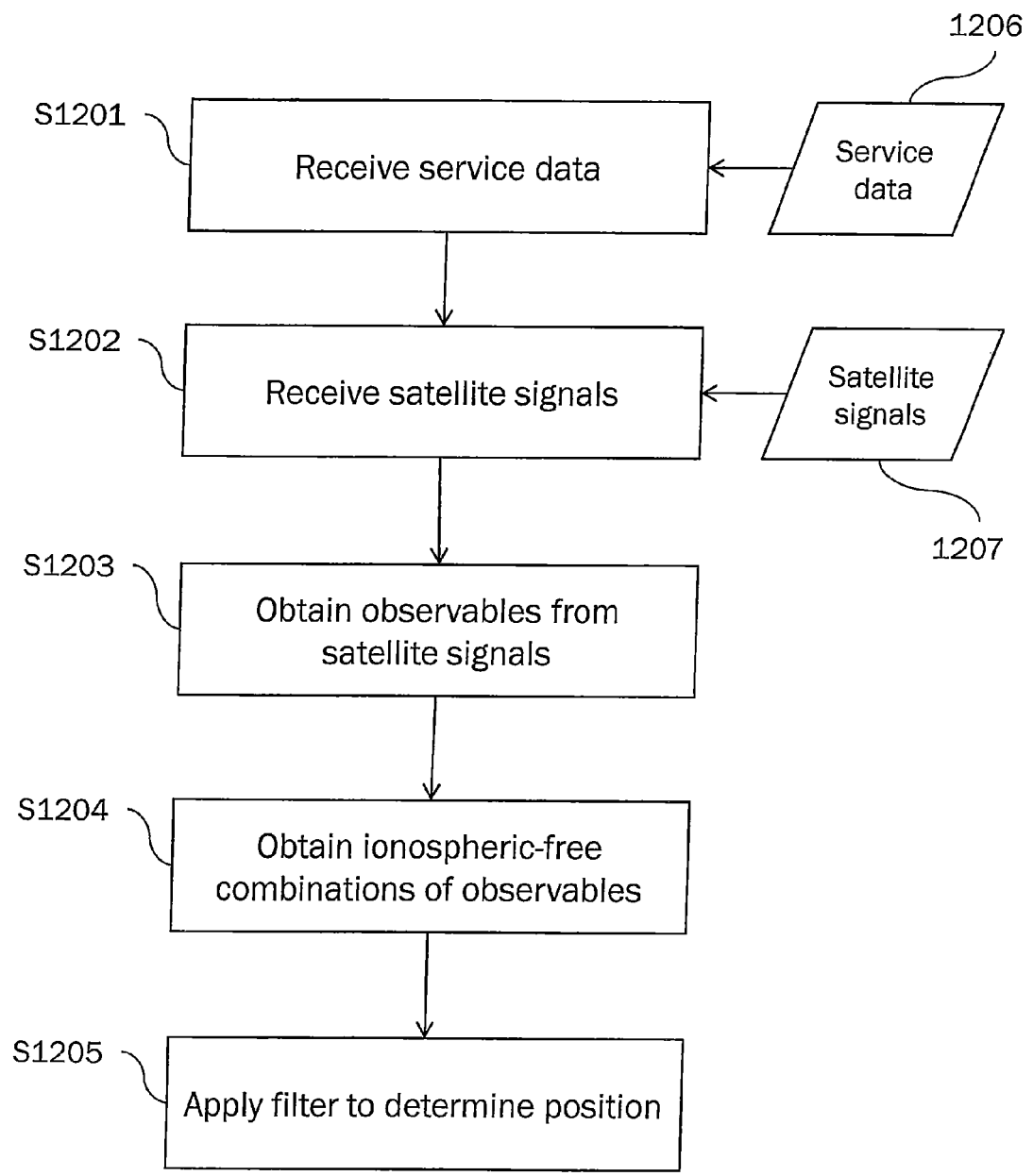
FIG. 10 shows a schematic flow diagram illustrating a prior art position determination method.

The main difference between the method described here and the method described above with reference to FIG. 3 is that in the present embodiment the first and/or second ambiguity respectively relating to the first and/or second linear combination of observables may be determined more accurately with the knowledge of the first fractional parts $\delta B_X^i$ relating to instrumental biases of the GNSS transmitters that are received with the service data 410. Accordingly, the accuracy of the determined user position in the present embodiment is further increased with respect to the previous embodiment: once the phase ambiguities are fixed, the user gets similar accuracies than after hours using the classical PPP approach (as illustrated in FIG. 10). Once the ambiguities are fixed, this improvement is instantaneously achieved.

An apparatus for carrying out the above-described steps according to the present embodiment of the present disclosure, in addition to some or all of the elements listed with respect to the apparatus for carrying out the steps according to the previous embodiment, may comprise means for fixing at least one ambiguity.

Figure 5:
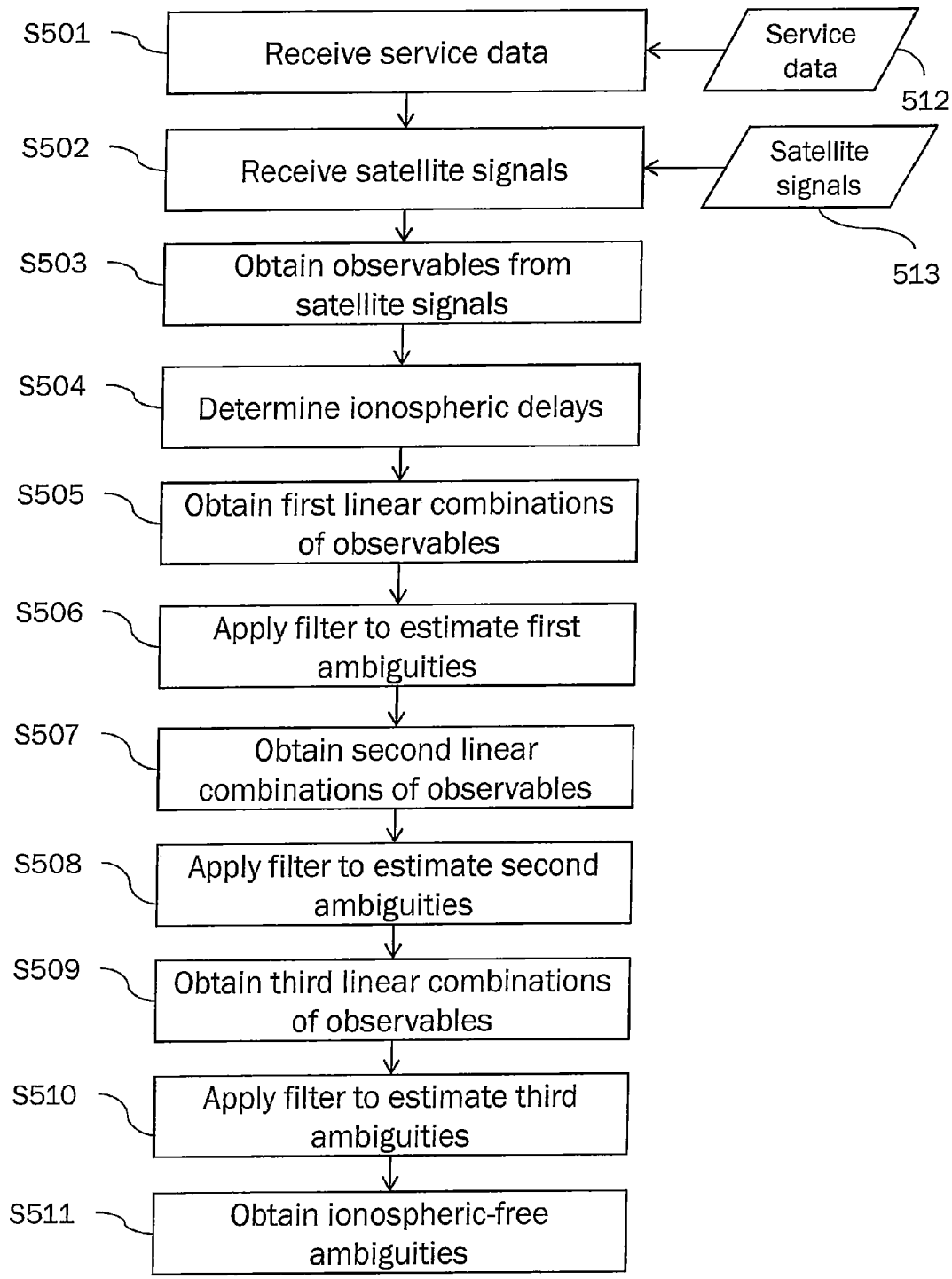
FIG. 5 shows a schematic flow diagram illustrating another embodiment of the present disclosure.

An embodiment of the present disclosure in which signals of three different carrier frequencies denoted by $f_1$, $f_2$, $f_3$, with $f_1 > f_2 > f_3$ (being $f_2 \sim f_3$ to get a very long wavelength, for example, more than 10 m with E5a and E5b in Galileo, for the extra-widelane carrier phase, see below) are received will be described next with reference to FIG. 5. Therein, signals of an arbitrary number of different carrier frequencies may be transmitted by the GNSS transmitters aboard the GNSS satellites in view of the user, but that the GNSS receiver at the user side may be limited to receiving signals of three different carrier frequencies only. Also, it may be the case that the GNSS receiver at the user side may receive signals of an arbitrary number of different carrier frequencies, but that only signals of two different carrier frequencies may be processed at the user side. The particular order and denotation of the carrier frequencies chosen above is not meant to be understood as a limitation of the method.

Steps S501 to S504 proceed in analogy to the previous embodiments. However, the service data 512 according to the present embodiment comprise satellite delay code bias data relating to satellite delay code biases that are different from those according to the embodiment discussed above with reference to FIG. 3. These differences will become apparent below. Also, it is noted that the service data 512 may or may not comprise satellite-phase bias data. If the service data 512 comprises satellite-phase bias data, it is understood that in the following, in steps S506, S508, and S510, the respective ambiguities may be determined (fixed) by taking into account the respective first fractional parts of the ambiguities as described with reference to steps S406 and S408 in FIG. 4.

In step S505, first linear combinations of the observables are obtained from the observables, similar to step S305. According to the present disclosure, the first linear combination is not an ionospheric-free linear combination. Preferably, the first linear combination of this embodiment has the maximum wavelength obtainable for a linear combination of observables relating to carrier frequencies $f_1$, $f_2$, $f_3$. If a first linear combination with a large wavelength is formed, ionospheric delays do not necessarily have to be taken into account at this step, although it is understood that ionospheric delays may be taken into account at this step.

While a number of different linear combinations of observables may be formed at step S505, according to an example of the present embodiment of the present disclosure, the first linear combination of observables preferably is a Melbourne-Wübbena combination $L_{ew}^i - P_{en}^i$ of extra-widelane carrier-phase observables $L_{ew}^i$ and extra-narrowlane code observables $P_{en}^i$. The extra-widelane carrier-phase observables $L_{ew}^i$ and extra-narrowlane code observables $P_{en}^i$ are obtained from the observables obtained at step S503 by:

$$L_{ew}^i = \frac{f_2 L_2^i - f_3 L_3^i}{f_2 - f_3} \quad \text{(Eq. 11)}$$

$$P_{en}^i = \frac{f_2 P_2^i + f_3 P_3^i}{f_2 + f_3} \quad \text{(Eq. 12)}$$

In step S506, a first ambiguity relating to the first linear combination of observables is estimated. From the first linear combination, a system of n observation equations can be obtained. By inputting delay code biases obtained from the delay code bias data and by applying a recursive estimation process to the system of n observation equations, the system may be solved and an ambiguity of the first linear combination of observables may be estimated. According to the present disclosure, the first ambiguity, which is the ambiguity of the first linear combination of observables, is different from the ionospheric-free ambiguities, that is, the first ambiguity is not ionospheric-free. Preferably, the recursive estimation process is a filter, and more preferably, the filter is a Kalman filter. In step S506, in the case of the first combination of observables being the Melbourne-Wübbena combination $L_{ew}^i - P_{en}^i$, a specific relation between the Melbourne-Wübbena combination, the satellite delay code biases $\tilde{D}^i$, the receiver delay code bias $\tilde{D}_k$, and the extra-widelane ambiguity $B_{ew}^i$ holds, and the following system of n observation equations is obtained:

$$L_{ew}^i - P_{en}^i + \frac{\lambda_{ew}\lambda_{en}}{\lambda_2\lambda_3}\tilde{D}^i = B_w^i - \frac{\lambda_{ew}\lambda_{en}}{\lambda_2\lambda_3}\tilde{D}_k \quad \text{(Eq. 13)}$$

Therein, the wavelengths $\lambda_{ew}$ and $\lambda_{en}$ are given by $\lambda_{ew}=c/(f_2-f_3)$ and $\lambda_{en}=c/(f_2+f_3)$, respectively, and the satellite delay code biases $\tilde{D}^i$ (which are different from the previous ones defined in the two-frequency case for frequencies $f_1$ and $f_2$) are included in the service data 512. By applying a recursive estimation process, preferably a filter, more preferably a Kalman filter, to the system of n equations (13), the extra-widelane ambiguity $B_{ew}$ can be expressed as a function of the receiver code delay code bias $\tilde{D}_k$, in a similar way as described in step S306 of FIG. 3. Therein, as indicated above, the expression "extra-widelane ambiguity" is understood to refer to the set of n extra-widelane ambiguities $B_{ew}^i$ corresponding to the GNSS transmitters aboard the GNSS satellites in view of the user. Obtaining the extra-widelane ambiguity $B_{ew}$ in this manner is feasible due to the very good properties of the Melbourne-Wübbena combination $L_{ew} - P_{en}$, in particular its long wavelength and the low noise for the extra-narrowlane code observable $P_{en}$. In addition, similar to step S406 in FIG. 4, the extra-narrowlane ambiguity $B_{ew}$ may be fixed at this step.

In step S507, a second linear combination of observables is obtained from the observables obtained at step S503. It is understood that the first linear combination and the second linear combination are linear independent combinations. According to the present disclosure, also the second linear combination of observables is not an ionospheric-free combination and is thus substantially affected by ionospheric delays. Preferably, the second linear combination has a wavelength shorter than that of the first linear combination. More specifically, according to the example of the present embodiment of the disclosure, the second linear combination of observables is the widelane carrier-phase observable $L_w$.

In step S508, the second ambiguity relating to the second linear combination of observables is estimated by applying a recursive estimation process, preferably a filter, more preferably a Kalman filter. According to the present disclosure, the second ambiguity, which is the ambiguity of the second linear combination of observables, is different from the ionospheric-free ambiguities, that is, the second ambiguity is not ionospheric-free. In the present embodiment of the disclosure, the difference between the extra-widelane and widelane carrier-phase observables $L_w - L_{ew}$ can be considered a proxy for the difference of both widelane and extra-widelane ambiguities $B_w - B_{ew}$, plus a level of ionospheric dependence. Therein, the ionospheric dependence can be removed by employing the ionospheric delays determined at step S504. Therefore, by applying a recursive estimation process, preferably a filter, more preferably a Kalman filter, the widelane ambiguity $B_w$ can be determined from the extra-widelane carrier-phase observable $L_{ew}$, the widelane carrier-phase observables $L_w$, and the extra-widelane ambiguity $B_{ew}$. In addition, similar to step S406 in FIG. 4, the widelane ambiguity $B_w$ may be fixed at this step.

In step S509, a third linear combination of observables is obtained. It is understood that the first, second, and third linear combinations of observables are linearly independent. According to the present disclosure, the third linear combination of observables is not ionospheric-free. Preferably, the third linear combination of observables is the ionospheric phase $L_I$. From here, the process proceeds as from step S308 in FIG. 3. Namely, in step S510 the third ambiguity is estimated in analogy to the second ambiguity of the embodiment of FIG. 3, and based thereon in step S511 a fourth ambiguity in analogy to the third ambiguity of the embodiment of FIG. 3 is obtained. According to the present disclosure, the third ambiguity, which is the ambiguity of the third linear combination of observables, is different from the ionospheric-free ambiguities. According to the present embodiment of the disclosure, the fourth ambiguity is the ionospheric-free ambiguity relating to the ionospheric-free combination of observables as given in Equation 1. In addition, similar to step S406 in FIG. 4, the third and fourth ambiguities may be fixed at this step.

From here, the determination of the user position may proceed according to steps S1204 and S1205 of FIG. 10, as already discussed above with respect to FIG. 3. Therein, the ionospheric-free combinations of observables $L_c$ and $P_c$ as given in Equations 1 and 2 are obtained and a recursive estimation process, preferably a filter, more preferably a Kalman filter, is applied to determine the user position. Since the ionospheric-free ambiguity $B_c$ is already known from step S511, the determination of the user position from the ionospheric-free combination of observables proceeds very rapidly.

Receiving signals of three different carrier frequencies $f_1$, $f_2$, and $f_3$ offers the advantage of an easier extra-widelane and widelane ambiguity estimation. Furthermore, from up to three independently estimated ambiguities, $B_{ew}$, $B_w$ and $B_f$, an independent precise estimation of the ionospheric-free ambiguity $B_c$ can be obtained, contributing significantly to the quick convergence and the precision of the determination of the user position. Typically, the convergence time of the two-carrier frequency case (to achieve an error at the 10-cm level), which is typically several minutes, can be reduced to single-epoch determination in the three-carrier frequency case.

An apparatus for carrying out the above-described steps according to the present embodiment of the disclosure may comprise some or all of the elements listed with respect to the apparatus for carrying out the steps according to the previous embodiments.

Figure 6:
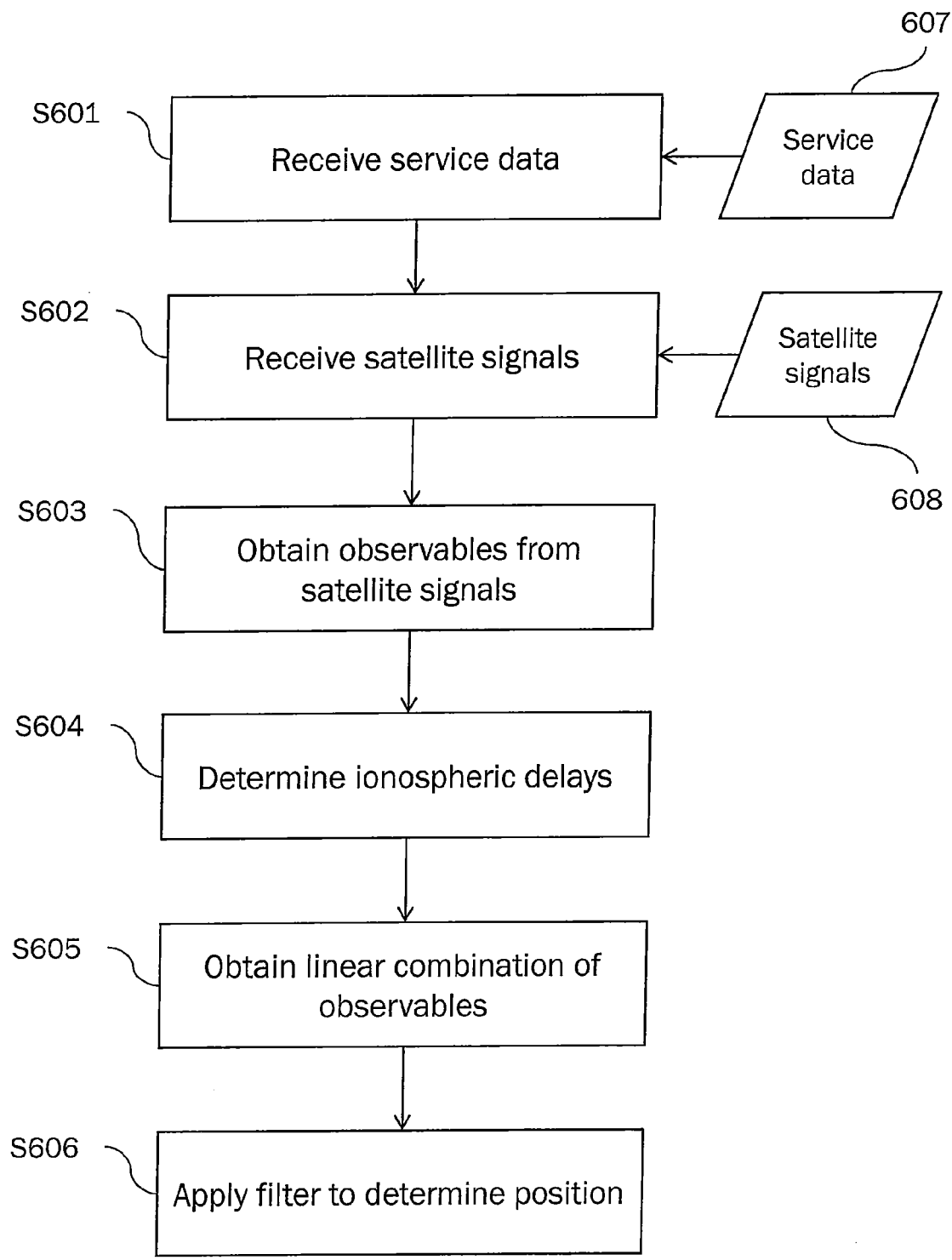
FIG. 6 shows a schematic flow diagram illustrating another embodiment of the present disclosure.

An embodiment in which the user receives signals of a single carrier frequency is described in FIG. 6. Therein, it is understood that signals of an arbitrary number of different carrier frequencies may be transmitted by the GNSS transmitters aboard the GNSS satellites in view of the user, but that the GNSS receiver at the user side may be limited to receiving signals of a single carrier frequency only. Also, it may be the case that the GNSS receiver at the user side may receive signals of an arbitrary number of different carrier frequencies, but that only signals of a single carrier frequency may be processed at the user side.

In step S601, as in the previous embodiments, service data 607 is received by the user. The service data 607 comprises precise satellite clocks, precise satellite orbits, satellite delay code biases, and the ionospheric model. The service data 607 may further comprise satellite fractional part ambiguities.

In step S602, satellite signals 608 of a single carrier frequency are received by the GNSS receiver of the user. Again, steps S601 and S602 may be interchanged.

In step S603, observables are obtained from the satellite signals. In the particular case of a single-frequency receiver, n carrier-phase observables $L^i$ and/or n code observables $P^i$ may be obtained. It is understood that at this step either all possible observables or only those observables that are required for use in the subsequent steps may be obtained. It is also understood that similar to the previous embodiments, linear combinations that are obtained from the observables may be obtained from the signals directly, that is, the steps of obtaining observables from the satellite signals and obtaining linear combinations of observables may be merged to a single step.

In step S604, the ionospheric delay relating to the linear combination of observables is determined from the ionospheric model in the same manner as in the previous embodiments. Therein, ionospheric delays relating to the observables may be determined first, and ionospheric delays relating to the linear combination of observables may be determined subsequently. However, the ionospheric delay relating to the linear combination of observables may be determined directly from the ionospheric model. As was the case in the previous embodiments, the ionospheric model may comprise reliability data indicating a position dependent reliability (accuracy) of the ionospheric model. In a case in which the ionospheric model is provided with reliability data, the accuracy of the ionospheric delays determined from the ionospheric model may be determined. In subsequent steps, when performing filter estimations, the accuracy of the ionospheric delays determined from the ionospheric model may be taken into account.

In step S605, a linear combination of observables is obtained. As in the previous embodiments, the linear combination of observables may be a trivial combination, and thus relate to an observable itself. Preferably, the linear combination of observables according to the present disclosure involves the carrier-phase observable L.

In step S606, a recursive estimation process, preferably a filter, more preferably a Kalman filter, is applied to determine the user position from the linear combination of observables. To this end, a set of observation equations relating to the linear combination of observables is obtained. The ionospheric delays obtained at the previous step may be used to correct for the impact of the ionospheric delay of the linear combination of observables. Furthermore, since the satellite clocks typically relate to the time frame of the ionospheric-free linear combination, the satellite delay code biases received with the service data 607 may be used to determine satellite clocks relating to the single-frequency signal. The obtained system of observation equations then is solved by applying the recursive estimation process.

Generally, when using single-frequency receivers it is not possible to obtain an ionospheric-free linear combination of carrier-phase observables, nor an ionospheric-free and geometric-free combination, such as the Melbourne-Wübbena combination. Therefore, since in conventional single-frequency receivers an estimation of carrier-phase ambiguities requires a significant amount of time, conventional single-frequency receivers perform a position determination exclusively based on the code observables $P^i$ (corrected with a simple ionospheric delay model such as, for instance, the Klobuchar ionospheric correction model). Accordingly, the accuracy of the determined position is low, typically of order of several meters, depending in particular on the quality of the ionospheric correcting model. In the present embodiment of the disclosure, the provision of the service data 607 (with precise satellite orbits and precise satellite clocks) allows for further consideration of the carrier-phase observables $L^i$ and linear combinations of the code observables and carrier-phase observables. In particular, determining the ionospheric delays of the observables allows mitigating the effects of ionospheric delays and determining the user position more accurately (below 1 meter with accurate enough ionospheric delay model, that is, with an uncertainty in the ionospheric delay up to about several cm in $L_1$).

The above methods of the embodiments of the present disclosure may be modified by simultaneously receiving and processing GNSS signals from two or more satellite systems (constellations), such as the GPS, GALILEO, GLONASS, and the like. Thereby, both convergence times and position accuracies may be improved. In such cases, it is understood that the service data comprises the elements as discussed above per each constellation. For instance, in a case in which signals from GPS and GALILEO satellites are received, satellite clocks for the GPS satellites and satellite clocks for the GALILEO satellites would have to be provided with the service data.

For the user-side methods of the above embodiments of the present disclosure, the provision of precise clocks, precise orbits, satellite delay code biases, an ionospheric model and optionally of satellite phase biases to the user is necessary.

Next, the determination of the elements of the service data such as the ionospheric model will be described with reference to FIG. 7 and FIG. 8.

Figure 7:
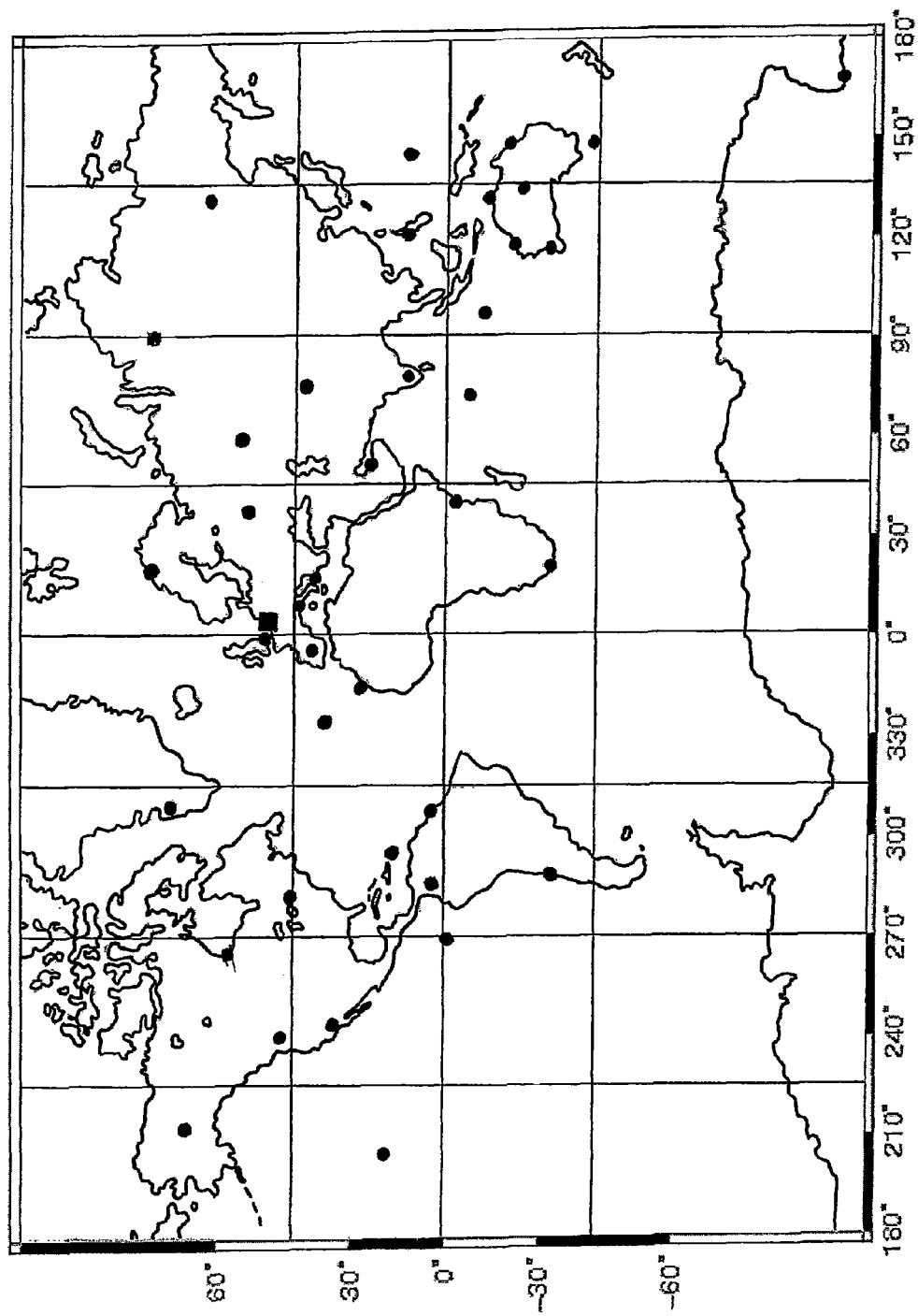
FIG. 7 shows a world map indicating exemplary positions of ground stations of a network of ground stations according to the present disclosure.

FIG. 7 shows a world map exemplarily indicating positions of a plurality of fixed ground stations each comprising at least one GNSS receiver. These fixed ground stations each further have transmission and/or reception means for exchanging data among each other. This data transmission can, for example, proceed through wire, radio, or other means of communication that may occur to the expert skilled in the art. Accordingly, the plurality of fixed ground stations form a network of fixed ground stations. Among the plurality of fixed ground stations, there is at least one CPF or first station, while the remaining fixed ground stations are referred to as second stations. As can be seen from the exemplary map, distances between neighboring fixed ground stations may range from several hundred kilometers to several thousands of kilometers.

Each of the second stations receives signals transmitted by GNSS transmitters aboard a number of GNSS satellites in view of the respective second station. Each second station then transmits the corresponding observation data to the at least one CPF. This exchange of observation data may be performed employing the Receiver INdependent EXchange (RINEX) format (or any other format or broadcasting means suitable for real-time application) by which raw GNSS data as received by the second stations is transmitted to the at least one CPF. At the at least one CPF, the observation data received from the plurality of second stations is processed in order to obtain the ionospheric model. A method for delivering the ionospheric model using a regional scale network of fixed ground stations having GNSS receivers and being in contact with a CPF is for instance known from U.S. Pre-Grant Publication No. 2006/0164297. From the GNSS signals received at each second station that were transmitted by GNSS transmitters aboard a number of GNSS satellites in view of the second station, the ionospheric delay of each GNSS signal may be determined. This may be done by applying a recursive estimation process, preferably a filter, more preferably a Kalman filter to a system of observation equations derived from the GNSS signals. From the ionospheric delays of the GNSS signals, for each received GNSS signal an integrated content of free electrons along the line of sight between the GNSS receiver receiving the signal and the GNSS transmitter aboard the GNSS satellite transmitting the signal, or a content of free electrons inside a cylinder aligned with the line of sight and having a cross-sectional area of, for instance, a square meter ($m^2$) may be determined. Therefrom, an ionospheric model indicating a position-resolved total free electron content of the ionosphere, or correspondingly, a position-resolved density of free electrons in the ionosphere. According to the present disclosure, the model may indicate a density of free electrons for a plurality of volume cells of predetermined size within the ionosphere. For instance, the ionosphere may be subdivided into a plurality of volume cells or "voxels" arranged on several layers enclosing the earth, and the ionospheric model may comprise the total amount of free electrons, or correspondingly the density of free electrons for each volume cell. Furthermore, a position-dependent density function indicating the density of free electrons in the ionosphere may be expanded into a plurality of functions, such as empirical orthogonal functions, spherical harmonics or Chapman profiles, and the ionosphere model may comprise the coefficients of these functions. It is understood that the listing of these functions is only of exemplary nature and that it occurs to the expert skilled in the art that also other functions beyond the above-mentioned functions may be used to subdivide the ionosphere.

The conventional method disclosed in U.S. Pre-Grant Publication No. 2006/0164297 applies to regional scale navigation systems. The method for obtaining the service data on the other hand is adapted to the above described global navigation technique and the global scale network of fixed ground stations. Furthermore, the method for obtaining the ionospheric model from the observation data obtained at the second stations is conceived to work in real-time, and the observation data is processed in an undifferenced mode by the at least one CPF. Carrier-phase ambiguities on the other hand are processed also in a double-differenced mode such that the carrier-phase ambiguities become integer quantities. Also, according to the method, not only the ionospheric model, but all elements of the service data, such as precise satellite clocks, precise satellite orbits, satellite delay code biases, satellite phase biases and the ionospheric model may be obtained by the same at least one CPF associated with a network of second stations. That is, the at least one CPF may be configured to provide all elements of the service data to the user in a consistent manner. In order to provide such service data, a number of modifications with respect to the conventional methods had to be implemented. These modifications will be discussed below.

First, it is known that GNSS satellites under eclipse present large errors on their predicted positions. In the prior art relating to a regional scale network of fixed ground stations, the effect of such errors is quite limited. However, on a global scale, these errors in particular in case of position errors in a circumferential direction with respect to the earth become important. Accordingly, the at least one CPF according to the present disclosure may comprise a module for detecting satellites under eclipse. Also, the at least one CPF may be adapted to detect satellites that are not under eclipse but nevertheless have large errors on their predicted position or predicted orbit. Accordingly, the at least one CPF comprises a module for detecting satellites with large errors on their predicted orbits.

Furthermore, when processing data obtained from a global scale network of fixed stations, it becomes necessary to correct the input orbits that are for instance obtained from the GPS control center or the GALILEO control center. According to the present disclosure, the orbits may be adjusted by an orbit perturbation model based on the analytical solutions of Hill liberalized dynamic equations. Accordingly, the at least one CPF may comprise a module for correction of the input orbits of the satellites.

Since the carrier-phase ambiguities are processed also in a double-differenced mode, reference receivers (or correspondingly, reference ground stations) and reference transmitters (or correspondingly, reference satellites) need to be defined. When working with a regional scale network of fixed ground stations, in which most of the time all of the considered GNSS satellites are in a common view of all fixed stations, it is sufficient to define one reference station and one reference satellite. On a global scale however, more than one reference satellite and more than one reference station need to be defined. Accordingly, the at least one CPF may comprise a module for selecting reference receivers and/or a module for selecting reference satellites.

In the above-described inventive navigation method, the service data preferably comprises satellite-phase bias data. Obtaining this satellite-phase bias data relating to the satellite fractional part of the ambiguities requires a dedicated filtering process processing the observation data and intermediate data obtained by preprocessing the observation data. Accordingly, the at least one CPF comprises a module for estimating the fractional part of the ambiguities (fractional ambiguities computation module).

Finally, the inventive navigation method disclosed above requires knowledge of precise satellite clocks and the method of delivering the remaining elements of the service data requires knowledge of precise receiver clocks (internal clocks of the second stations). Therein, the precise satellite clocks need to be updated at the rover at very short time intervals, typically once every epoch. Since the filtering processes employed for delivering, for instance the ionospheric model proceed with time scales of several minutes, a dedicated fast filtering process for computing the precise satellite clocks and precise receiver clocks is required. Accordingly, the at least one CPF may comprise in addition to a slow filter also a fast filter with a time scale of approximately a second.

Figure 8:
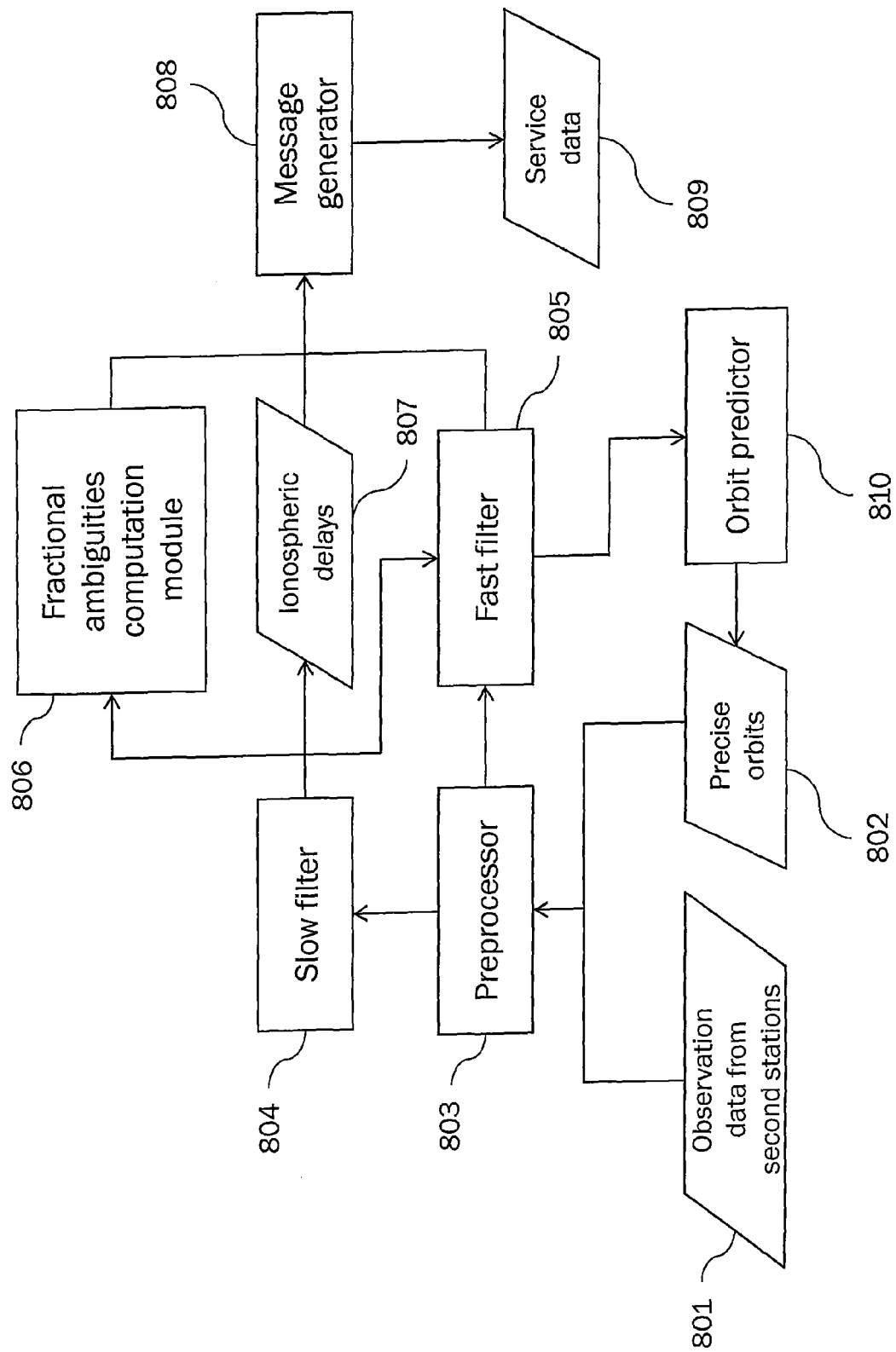
FIG. 8 illustrates an outline of a central processing facility according to the present disclosure.

FIG. 8 schematically shows the layout of the inventive central processing facility. A preprocessor 803 is provided with the observation data 801 obtained at the second stations and precise orbits 802 predicted by an orbit predictor 810. The preprocessor 803 comprises the module for detecting satellites under eclipse, and further detects whether a cycle slip has occurred and performs modeling related to the observation data 801 obtained at the second stations. The output of the preprocessor 803 is supplied to the slow filter 804 and the fast filter 805. In the slow filter 804, ionospheric-free ambiguities $B_c$ and ionospheric ambiguities $B_I$ relating to the observation data, tropospheric corrections relating to the observation data and the Hill coefficients for correcting the satellite orbits (or any other set of orbit correction parameters), precise receiver clocks, precise satellite clocks, satellite delay code biases, receiver delay code biases, and the ionospheric model are determined. An output of the slow filter 804 is then provided to the fractional ambiguities computation module 806, and the fast filter 805, while the ionospheric model 807 is provided to a message generator 808. In the fractional ambiguities computation module 806, the satellite carrier-phase biases or correspondingly the satellite fractional part of the ambiguities is estimated by way of a filtering process based on the output of the slow filter 804. In the fast filter 805, precise receiver clocks and precise satellite clocks are estimated by way of a filtering process based on the output of the slow filter 804. The output of the fast filter 805 is then provided to the orbit predictor 810 predicting precise orbits for subsequent use, and to the message generator 808. The output of the fractional ambiguities computation module 806 is provided to the message generator 808. Based on the input received from the slow filter 804, the fast filter 805, and the fractional ambiguities computation module 806, the message generator generates the service data 809 comprising satellite clock data indicating internal clocks of the satellites, satellite orbit data indicating positions of the satellites, satellite delay code bias data relating to delay code biases of the GNSS transmitters, and ionospheric model data indicating a state of an ionosphere, and transmits the service data 809 to a user.

Since the different elements of the service data 809 change over different time scales, they may be transmitted by the CPF at different time intervals, giving rise to different refresh rates at the user-side. For instance, the accuracy of the satellite clocks maintained at the user side rapidly degrades in the absence of fresh input, while the state of the ionosphere typically changes with a time scale of hours, or at least of tens of minutes. Accordingly, the satellite clocks may be transmitted with the highest refresh rate, preferably at each epoch, the satellite orbits may be transmitted with a reduced refresh rate, preferably every few minutes, the satellite delay code biases and satellite fractional part ambiguities may be transmitted with a further reduced refresh rate, preferably every several minutes, and the ionospheric model may be transmitted also with a low refresh rate of several minutes.

Figure 9:
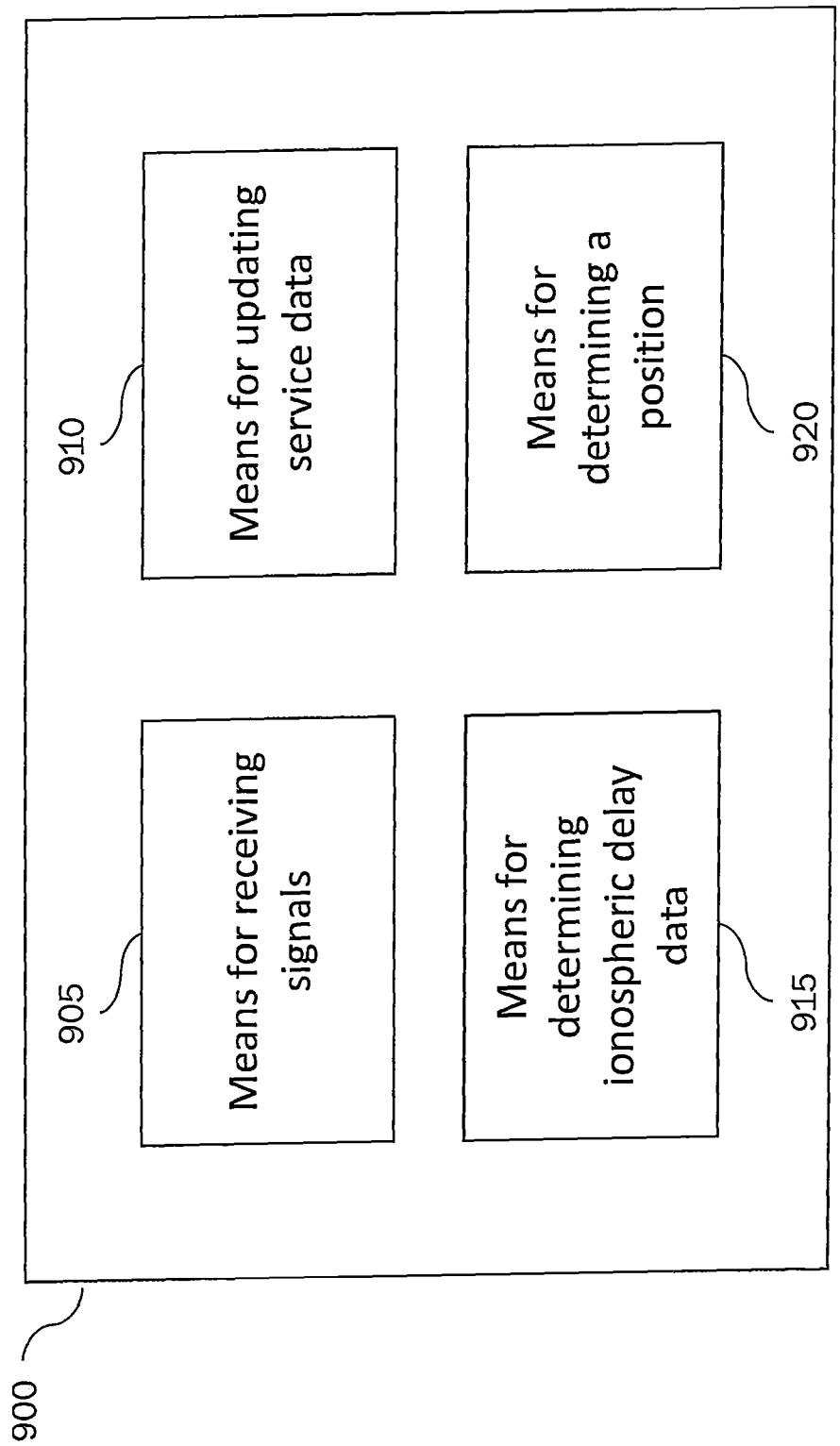
FIG. 9 schematically illustrates an apparatus for determining the position of a rover using the inventive method.

FIG. 9 schematically illustrates an apparatus for determining a position of a rover using the method. Reference numeral 905 indicates means for receiving signals which are transmitted by GNSS transmitters on board a given number of satellites positioned in a view of the apparatus, reference numeral 910 indicates means for updating service data, the service data comprising satellite clock data indicating internal clocks of the satellites, satellite orbit data indicating positions of the satellites, satellite delay code bias data relating to delay code biases of the GNSS transmitters and ionospheric model data indicating a state of an ionosphere, reference numeral 915 indicates means for determining, based on the ionospheric model data, ionospheric delay data indicating corrections relating to delays of the signals, the delays of the signals resulting from a passage of the signals through the ionosphere between transmission of the signals from the GNSS transmitters and reception of the signals by the means for receiving signals, and reference numeral 920 indicates means for determining a position of the apparatus based on the signals, the satellite clock data, the satellite orbit data, the satellite delay code bias data, and the ionospheric delay data.

In the above, preferred embodiments of the present disclosure have been described. Features, components and specific details of the above-described aspects of the present disclosure may be exchanged or combined to form further aspects optimized for the respective application. As far as those modifications are apparent to the persons skilled in the art, they shall be implicitly disclosed by the present description without, for the sake of conciseness, explicitly specifying every possible combination. Furthermore, it is to be noted that the steps of the method and means of the apparatus as described above may be realized by hardware, software, or combinations thereof.

While illustrative embodiments have been illustrated and described, it will be appreciated that various changes can be made therein without departing from the spirit and scope of the present disclosure.

The invention claimed is:

1. A method for determining a position of an object having a Global Navigation Satellite System (GNSS) receiver, the method comprising the steps of:

receiving signals by the GNSS receiver that are transmitted by GNSS transmitters ($GNSS_{E1}$ to $GNSS_{En}$) positioned on board satellites ($SAT_1$ to $SAT_n$) that are positioned in view of the object;

updating service data in the object, the service data being provided by a GNSS service provider and including:
satellite clock data indicating internal clocks of the satellites ($SAT_1$ to $SAT_n$);
satellite orbit data indicating positions of the satellites ($SAT_1$ to $SAT_n$);
satellite delay code bias data relating to delay code biases of the GNSS transmitters ($GNSS_{E1}$ to $GNSS_{En}$); and ionospheric model data indicating a state of an ionosphere;

determining, based on the ionospheric model data, ionospheric delay data indicating corrections relating to delays of the signals, the delays of the signals resulting from a passage of the signals through the ionosphere between transmission of the signals from the GNSS transmitters ($GNSS_{E1}$ to $GNSS_{En}$), and reception of the signals by the GNSS receiver ($SUR_{GNSS}$);

obtaining code observation data from the signals, the code observation data relating to data transmitted with the signals and comprising code observables relating to data transmitted with the signals;

obtaining carrier-phase observation data from the signals, the carrier-phase observation data relating to carrier phases of the signals and comprising carrier-phase observables relating to the carrier phase of the signals; and determining a position of the object based on the satellite clock data, the satellite orbit data, the satellite delay code bias data, the determined ionospheric delay data, the code observation data obtained from the signals, and the carrier-phase observation data obtained from the signals, wherein all code observables and all carrier-phase observables involved in the step of determining the position of the object are processed in an undifferenced mode, and wherein, in the step of determining the position of the object, at least one linear combination of observables that is not ionospheric free and additionally a linear combination of observables that is ionospheric free are processed.

2. The method according to claim 1, further comprising at least one of the steps of:
   determining an ionospheric delay of a code observable;
   determining an ionospheric delay of a carrier-phase observable;
   determining an ionospheric delay of a geometric-free combination of code observables; and
   determining an ionospheric delay of a geometric-free combination of carrier-phase observables.

3. The method according to claim 1, wherein the service data further comprises satellite-phase bias data relating to carrier-phase biases of the GNSS transmitters ($GNSS_{E1}$ to $GNSS_{En}$), and
   wherein the step of determining the position of the object further comprises a step of determining carrier-phase ambiguity data indicating for at least one signal a count of full cycles comprised in a phase difference between a carrier phase of the signal at a transmission timing and a carrier phase of the signal at a reception timing based on the carrier-phase observation data and the satellite-phase bias data.

4. The method according to claim 1, wherein in the step of determining the position of the object, at least one recursive estimation process is executed.

5. The method according to claim 4, wherein at each step of the at least one recursive estimation process state data, comprising at least one of the position of the object and carrier-phase ambiguity data, is estimated based on the signals, the satellite clock data, the satellite orbit data, the ionospheric delay data, and an estimate of the state data estimated at the previous step.

6. The method according to claim 1, wherein the ionospheric model data comprises ionospheric model reliability data relating to a position-dependent reliability of the ionospheric model data, and wherein the step of determining the position of the object is further based on the ionospheric model reliability data.

7. The method according to claim 1, wherein:
   at least one fixed ground station serves as a central processing facility;
   a plurality of fixed ground stations that each have a GNSS receiver serve as network stations;
   the at least one central processing facility and the plurality of network stations form a network;
   the service data is obtained by the network and transmitted to the object; and
   obtaining the ionospheric model data comprises the steps of:
      receiving at the network stations signals of at least two different frequencies transmitted by GNSS transmitters positioned aboard a plurality of satellites arranged in view of at least one of the network stations;
      determining network ionospheric delay data indicating corrections relating to delays of the signals received at the network stations, the delays of the signals received at the network stations resulting from a passage of the signals received at the network stations through the ionosphere; and
      determining the ionospheric model data from the network ionospheric delay data.

8. The method according to claim 7, wherein determining the ionospheric model data further comprises the steps of:
   expanding the number density of free electrons in the ionosphere into a plurality of functions; and
   estimating electron content data indicating coefficients of the plurality of functions based on the network ionospheric delay data.

9. The method according to claim 7, wherein geodetic data relating to at least one of internal clocks of the plurality of satellites, positions of the plurality of satellites, delay code biases of the GNSS transmitters aboard the plurality of satellites, and carrier-phase biases of the GNSS transmitters aboard the plurality of satellites, and ionospheric data relating to a state of the ionosphere are processed simultaneously by a first estimation process and a second estimation process, the first and second estimation processes having different processing speeds and interacting with each other.

10. The method according to claim 1, wherein a satellite clock refresh rate, a satellite orbit data refresh rate, and an ionospheric model refresh rate, respectively, indicating a rate with which the satellite clock data is continuously updated at the object, a rate with which the satellite orbit data is continuously updated at the object, and a rate with which the ionospheric model data is continuously updated at the object, are chosen such that the satellite clock data refresh rate is larger than the satellite orbit data refresh rate and the satellite clock data refresh is larger than the ionospheric model data refresh rate.

11. An apparatus for determining a position, the apparatus comprising:
   means for receiving signals which are transmitted by GNSS transmitters (GNSSE1 to GNSSEn) on board a given number of satellites (SAT1 to SATn) positioned in view of the apparatus;
   means for updating service data, the service data being provided by a GNSS service provider and including:
      satellite clock data indicating internal clocks of the satellites ($SAT_1$ to $SAT_n$);
      satellite orbit data indicating positions of the satellites ($SAT_1$ to $SAT_n$);

satellite delay code bias data relating to delay code biases of the GNSS transmitters (GNSS$_{E1}$ to GNSS$_{En}$); and ionospheric model data indicating a state of an ionosphere;

means for determining, based on the ionospheric model data, ionospheric delay data indicating corrections relating to delays of the signals, the delays of the signals resulting from a passage of the signals through the ionosphere between transmission of the signals from the GNSS transmitters (GNSS$_{E1}$ to GNSS$_{En}$) and reception of the signals by the means for receiving signals;

means for obtaining code observation data from the signals, the code observation data relating to data transmitted with the signals and comprising code observables relating to data transmitted with the signals;

means for obtaining carrier-phase observation data from the signals, the carrier-phase observation data relating to carrier phases of the signals and comprising carrier-phase observables relating to the carrier phase of the signals; and means for determining a position of the apparatus based on the satellite clock data, the satellite orbit data, the satellite delay code bias data, the determined ionospheric delay data, the code observation data obtained from the signals, and the carrier-phase observation data obtained from the signals, wherein the means for determining a position is configured to process all code observables and all carrier-phase observables in an undifferenced mode, and wherein the means for determining a position is further configured to process at least one linear combination of observables that is not ionospheric free, and additionally a linear combination of observables that is ionospheric-free.

12. A system comprising the apparatus of claim 11 and a network formed by at least one central processing facility that includes a fixed ground station and a plurality of network stations that are fixed ground stations and that each have a GNSS receiver, wherein the at least one central processing facility and the plurality of network stations form a network, and wherein the service data is obtained by the network and transmitted to the apparatus.

* * * * *